US009473289B2

(12) United States Patent
Yao et al.

(10) Patent No.: US 9,473,289 B2
(45) Date of Patent: Oct. 18, 2016

(54) PUCCH RESOURCE ALLOCATION AND USE

(71) Applicant: Nokia Solutions and Networks Oy, Espoo (FI)

(72) Inventors: Chun Hai Yao, Beijing (CN); Timo Erkki Lunttila, Espoo (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 43 days.

(21) Appl. No.: 14/498,286

(22) Filed: Sep. 26, 2014

(65) Prior Publication Data

US 2015/0092624 A1    Apr. 2, 2015

Related U.S. Application Data

(60) Provisional application No. 61/923,325, filed on Jan. 3, 2014, provisional application No. 61/883,469, filed on Sep. 27, 2013.

(51) Int. Cl.

| H04J 3/00 | (2006.01) |
|---|---|
| H04B 7/00 | (2006.01) |
| H04W 4/00 | (2009.01) |
| H04L 5/14 | (2006.01) |
| H04L 5/00 | (2006.01) |
| H04L 1/18 | (2006.01) |
| H04L 1/16 | (2006.01) |

(52) U.S. Cl.
CPC .......... *H04L 5/1461* (2013.01); *H04L 1/1671* (2013.01); *H04L 1/1812* (2013.01); *H04L 1/1861* (2013.01); *H04L 5/0055* (2013.01)

(58) Field of Classification Search
CPC . H04L 5/0037; H04L 1/1861; H04L 5/0055; H04W 72/0413; H04W 72/042
See application file for complete search history.

(56) References Cited

U.S. PATENT DOCUMENTS

| 2013/0155915 A1 | 6/2013 | Park et al. |
|---|---|---|
| 2013/0294423 A1 | 11/2013 | Wang |

(Continued)

FOREIGN PATENT DOCUMENTS

CN    WO 2013064106 A1 *    5/2013    ........... H04L 5/0037

OTHER PUBLICATIONS

NEC Group; "Backward compatibility for TDD eIMTA system"; R1-133339; 3GPP TSG RAN WG1 Meeting #74; Barcelona, Spain, Aug. 19-23, 2013; whole document (3 pages).

(Continued)

*Primary Examiner* — Melanie Jagannathan
(74) *Attorney, Agent, or Firm* — Harrington & Smith

(57) ABSTRACT

A base station determines a first set of PUCCH resources to use for a first set of UEs to send acknowledgment information to the base station for a first group of DL subframes. The first set of PUCCH resources starts at a first index. The base station determines a second set of PUCCH resources to use for a second set of UEs to send acknowledgment information to the base station for a second group of DL subframes. The second set of PUCCH resources starts at a second index. The UEs in the first set only use the first set of PUCCH resources. The UEs in the second set use the first and second sets of PUCCH resources. For an UL reception, acknowledgement information is received from the first UEs using the first set of PUCCH resources and from the second UEs using the first and second sets of PUCCH resources.

19 Claims, 13 Drawing Sheets

(56) References Cited

U.S. PATENT DOCUMENTS

2014/0161001 A1 6/2014 Gao
2014/0301338 A1 10/2014 Zhong et al.

OTHER PUBLICATIONS

3GPP TS 36.211 V12.0.0 (Dec. 2013); "3rd Generation Partnership Project; Technical Specification Group Radio Access Network; Evolved Universal Terrestrial Radio Access (E-UTRA); Physical channels and modulation (Release 12)"; Dec. 2013; whole document (120 pages).

NEC Group; "Study of backward compatibility of TDD eIMTA system"; R1-130371; 3GPP TSG RAN WG1 Meeting #72, St. Julian's, Malta; Jan. 28-Feb. 1, 2013; whole document (5 pages).

3GPP TS 36.213 V11.3.0 (Jun. 2013); "3rd Generation Partnership Project; Technical Specification Group Radio Access Network; Evolved Universal Terrestrial Radio Access (E-UTRA); Physical layer procedures (Release 11)"; Jun. 2013; whole document (176 pages).

CATT; "New work item proposal for Further Enhancements to LTE TDD for DL-UL Interference Management and Traffic Adaptation"; RP-121772; 3GPP TSG-RAN Meeting #58, Barcelone, Spain; Dec. 4-7, 2012; whole document (15 pages).

Mediatek Inc.; "Discussion on HARQ-ACK resource in TDD Eimta"; R1-133282; 3GPP TSG-RAN WG1 Meeting #74, Barcelona, Spain; Aug. 19-23, 2013; whole document (3 pages).

Nsn et al.; "On HARQ timing for TDD eIMTA"; R1-133477; 3GPP TSG-RAN WG1 Meeting #74, Barcelona, Spain; Aug. 19-23, 2013; whole document (4 pages).

* cited by examiner

FIG 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | 4 | – | – | 6 | – | 4 |
| 1 | – | – | 7, 6 | 4 | – | – | – | 7, 6 | 4 | – |
| 2 | – | – | 8, 7, 4, 6 | – | – | – | – | 8, 7, 4, 6 | – | – |
| 3 | – | – | 7, 6, 11 | 6, 5 | 5, 4 | – | – | – | – | – |
| 4 | – | – | 12, 8, 7, 11 | 6, 5, 4, 7 | – | – | – | – | – | – |
| 5 | – | – | 13, 12, 9, 8, 7, 5, 4, 11, 6 | – | – | – | – | – | – | – |
| 6 | – | – | 7 | 7 | 5 | – | – | 7 | 7 | – |

FIG 3

Subframe number    8 9 0 1 2 3 4 5 6 7 8 9 0 1 2 3 4 5 6 7 8 9

UL/DL configuration 4  | D | D | S | U | U | D | D | D | D | D | D | D | S | U | D | D | D | D | D | D | D | D |

DL HARQ-ACK timing for configuration 4

UL/DL configuration 5  | D | D | S | U | D | D | D | D | D | D | D | D | S | U | D | D | D | D | D | D | D | D |

DL HARQ-ACK timing for configuration 5

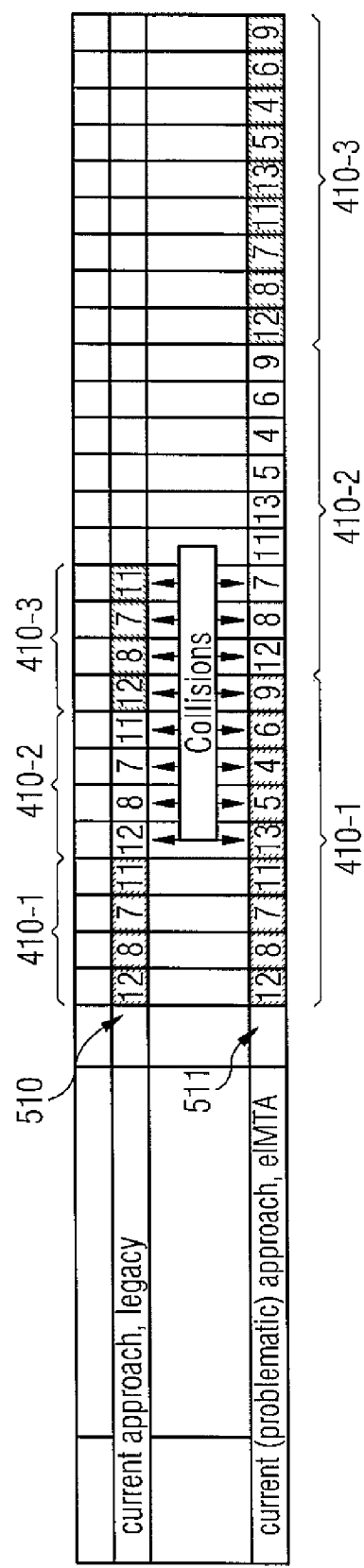

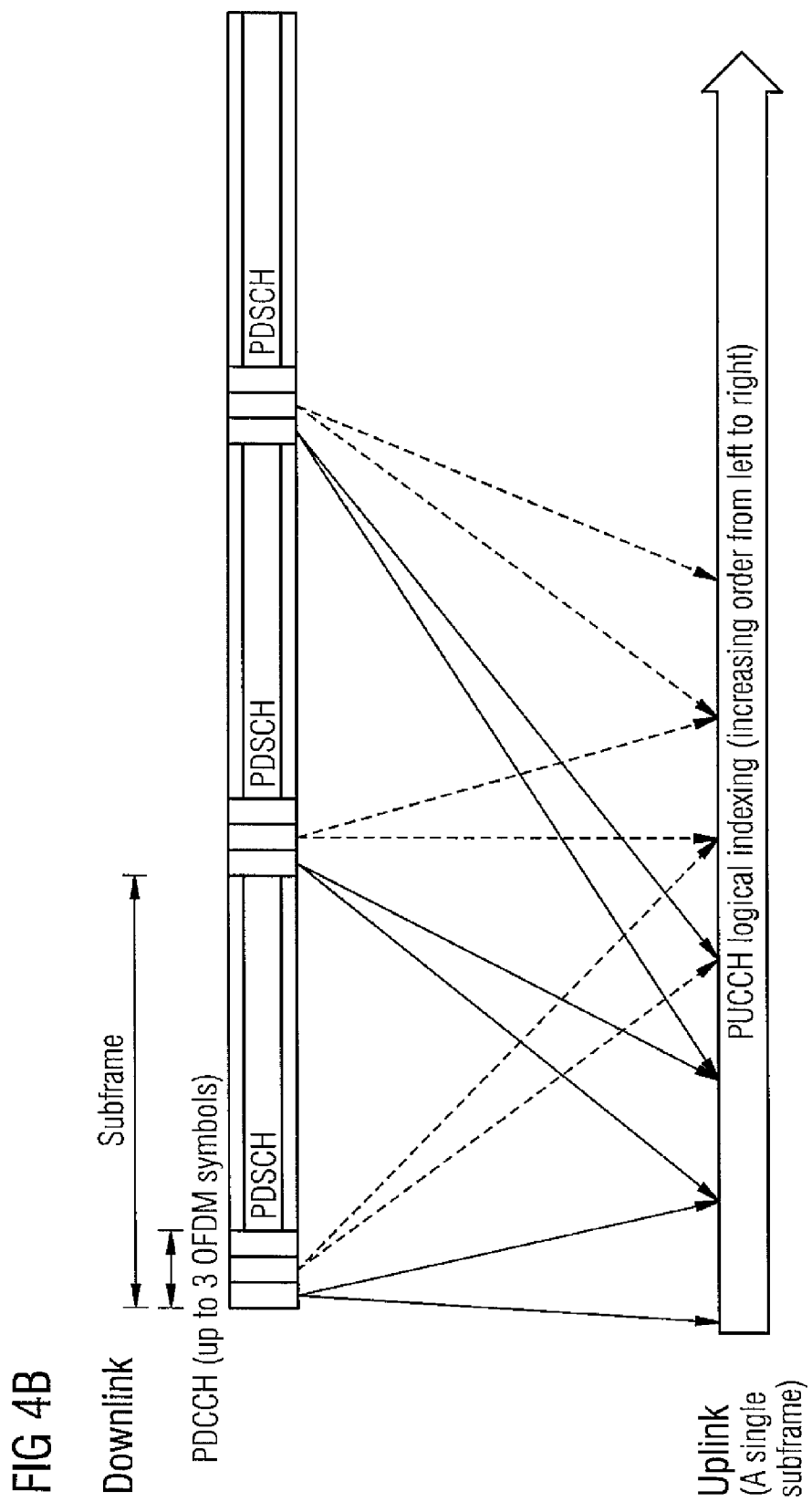

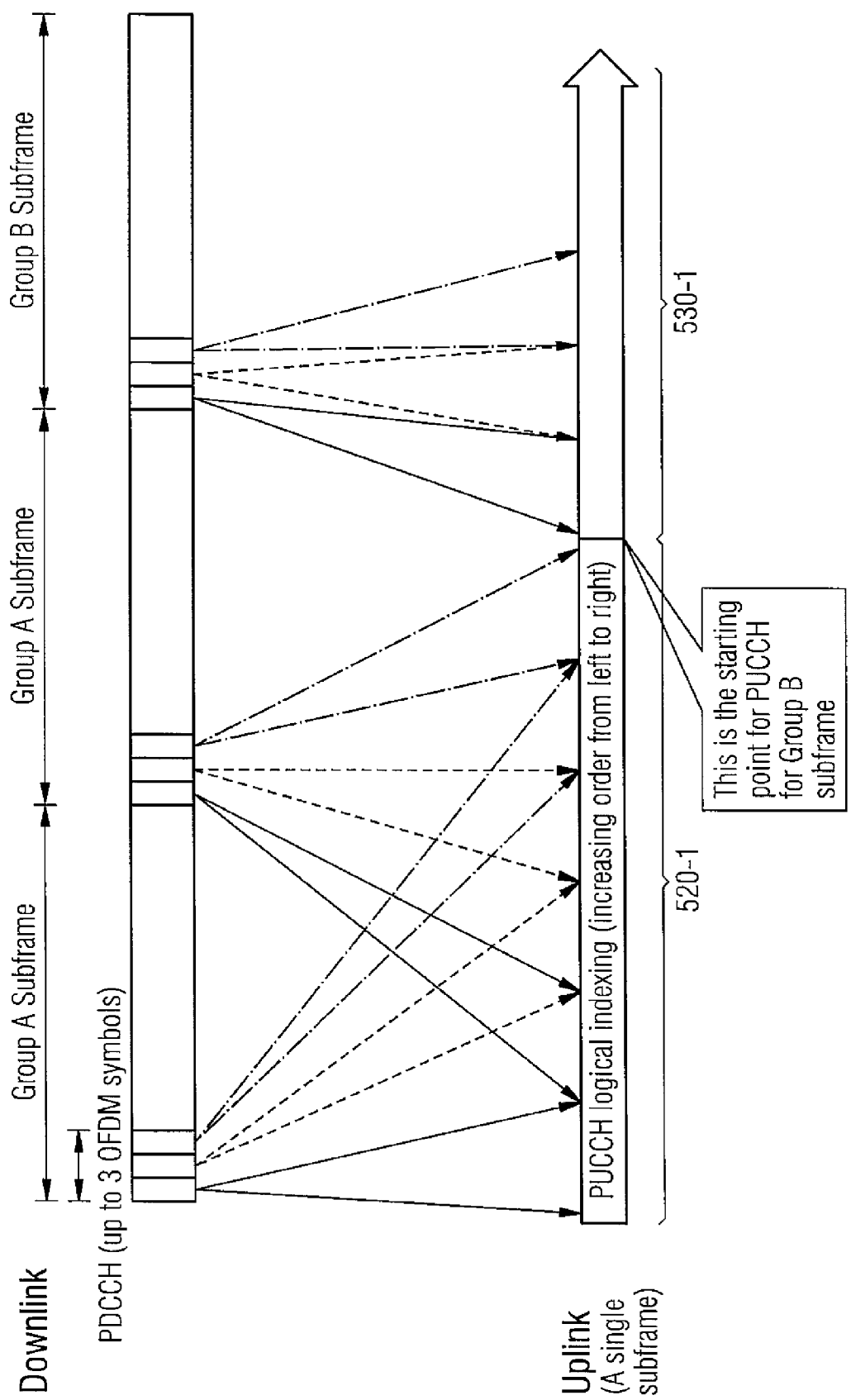

FIG 6

| DL HARQ reference configuration | UL-DL Configuration given by SIB1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6 | — | — | — | — | 6 | — | — |
| | 1 | — | — | 7,6 | — | — | — | — | 7,6 | — | — |
| | 2 | — | — | 8,7,4,6 | — | — | — | — | 8,7,4,6 | — | — |
| | 3 | invalid | | | | | | | | | |
| | 4 | invalid | | | | | | | | | |
| | 5 | invalid | | | | | | | | | |
| | 6 | — | — | 7 | — | — | — | — | 7 | — | — |
| 4 | 0 | — | — | (6) | — | — | — | — | — | — | — |
| | 1 | — | — | 7,(6) | 4 | — | — | — | — | — | — |
| | 2 | invalid | | | | | | | | | |
| | 3 | — | — | 7,(6),11 | 6,5 | — | — | — | — | — | — |
| | 4 | — | — | 12,8,7,11 | 6,5,4,7 | — | — | — | — | — | — |
| | 5 | invalid | | | | | | | | | |
| | 6 | — | — | 7 | 7 | — | — | — | — | — | — |
| 5 | 0 | — | — | 6 | — | — | — | — | — | — | — |
| | 1 | — | — | 7,6 | — | — | — | — | — | — | — |
| | 2 | — | — | 8,7,4,6 | — | — | — | — | — | — | — |
| | 3 | — | — | 7,6,11 | — | — | — | — | — | — | — |
| | 4 | — | — | 12,8,7,11 | — | — | — | — | — | — | — |
| | 5 | — | — | 13,12,9,8,7,5,4,11,6 | — | — | — | — | — | — | — |
| | 6 | — | — | 7 | — | — | — | — | — | — | — |

FIG 7

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7,8,4 | — | — | — | — | 7,8,4 | — | — |
| | 1 | — | — | 8,4 | — | — | — | — | 8,4 | — | — |
| | 2 | — | — | — | — | — | — | — | — | — | — |
| | 3 | invalid | | | | | | | | | |
| | 4 | invalid | | | | | | | | | |
| | 5 | invalid | | | | | | | | | |
| | 6 | — | — | 6,8,4 | — | — | — | — | 6,8,4 | — | — |
| 4 | 0 | — | — | 12,7,11,8 | 7,6,5,4 | — | — | — | — | — | — |
| | 1 | — | — | 12,8,11 | 7,6,5 | — | — | — | — | — | — |
| | 2 | invalid | | | | | | | | | |
| | 3 | — | — | 12,8 | 4,7 | — | — | — | — | — | — |
| | 4 | — | — | — | — | — | — | — | — | — | — |
| | 5 | invalid | | | | | | | | | |
| | 6 | — | — | 12,11,8 | 4,6,5 | — | — | — | — | — | — |
| 5 | 0 | — | — | 12,7,11,13,8,4,9,5 | — | — | — | — | — | — | — |
| | 1 | — | — | 13,12,8,11,4,9,5 | — | — | — | — | — | — | — |
| | 2 | — | — | 13,12,9,11,5 | — | — | — | — | — | — | — |
| | 3 | — | — | 13,12,5,4,8,9 | — | — | — | — | — | — | — |
| | 4 | — | — | 13,5,4,6,9 | — | — | — | — | — | — | — |
| | 5 | — | — | — | — | — | — | — | — | — | — |
| | 6 | — | — | 13,12,11,6,8,4,9,5 | — | — | — | — | — | — | — |

FIG 8

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | – | – | 6,7,8,4 | – | – | – | – | 6,7,8,4 | – | – |
| | 1 | – | – | 7,6,8,4 | – | – | – | – | 7,6,8,4 | – | – |
| | 2 | – | – | 8,7,4,6 | – | – | – | – | 8,7,4,6 | – | – |
| | 3 | invalid | | | | | | | | | |
| | 4 | invalid | | | | | | | | | |
| | 5 | invalid | | | | | | | | | |
| | 6 | – | – | 7,6,8,4 | – | – | – | – | 7,6,8,4 | – | – |
| 4 | 0 | – | – | 12,7,11,8 | 7,6,5,4 | – | – | – | – | – | – |
| | 1 | – | – | 7,12,8,11 | 4,7,6,5 | – | – | – | – | – | – |
| | 2 | invalid | | | | | | | | | |
| | 3 | – | – | 7,11,12,8 | 6,5,4,7 | – | – | – | – | – | – |
| | 4 | – | – | 12,8,7,11 | 6,5,4,7 | – | – | – | – | – | – |
| | 5 | invalid | | | | | | | | | |
| | 6 | – | – | 7,12,11,8 | 7,4,6,5 | – | – | – | – | – | – |
| 5 | 0 | – | – | 6,12,7,11,13,8,4,9,5 | – | – | – | – | – | – | – |
| | 1 | – | – | 7,6,13,12,8,11,4,9,5 | – | – | – | – | – | – | – |
| | 2 | – | – | 8,7,4,6,13,12,9,11,5 | – | – | – | – | – | – | – |
| | 3 | – | – | 7,6,11,13,12,5,4,8,9 | – | – | – | – | – | – | – |
| | 4 | – | – | 12,8,7,11,13,5,4,6,9 | – | – | – | – | – | – | – |
| | 5 | – | – | 13,12,9,8,7,5,4,11,6 | – | – | – | – | – | – | – |
| | 6 | – | – | 7,13,12,11,6,8,4,9,5 | – | – | – | – | – | – | – |

FIG 9

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

PUCCH RESOURCE ALLOCATION AND USE

CROSS-REFERENCE TO RELATED APPLICATIONS

This application claims the benefit of U.S. application No. 61/883,469, filed on Sep. 27, 2013, by inventors Esa T. Tiirola and Timo E. Lunttila, and entitled "HARQ-ACK Resource Allocation and Use for eIMTA", and claims the benefit of U.S. application No. 61/923,325, filed on Jan. 3, 2014, by inventors Chun H. Yao, Timo E. Lunttila, and Esa T. Tiirola, the disclosures of which are hereby incorporated by reference in their entirety. U.S. application No. 61/883, 469 is now U.S. patent Ser. No. 14/475,797, filed on Sep. 3, 2014, and the instant application claims the benefit of U.S. patent Ser. No. 14/475,797, the disclosure of which is hereby incorporated by reference in its entirety.

TECHNICAL FIELD

This invention relates generally to Hybrid Automatic Repeat reQuest (HARQ) resource allocation and, more specifically, relates to HARQ resource allocation for Enhanced Interference Management and Traffic Adaptation (eIMTA) on the Physical Uplink Control Channel (PUCCH).

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined at the end of the specification but prior to the claims.

There is a 3GPP Release 12 feature "Further enhancement to LTE TDD for DL-UL Interference Management and Traffic Adaptation (TDD_eIMTA)". The goal of eIMTA WI is to enable more flexible TDD UL-DL reconfiguration for traffic adaptation in, e.g., small cells. The starting point following the Rel-12 assumptions is that the eNodeB (e.g., for the small cell) may vary the UL-DL configuration relatively often (for those UEs configured to flexible UL/DL mode) compared to the existing situation where the UL-DL configuration is in practice very stationary.

In this disclosure, focus is placed on PUCCH resource allocation, e.g., for TDD eIMTA. It has been decided to arrange HARQ/scheduling timing for eIMTA according to a so-called reference configuration principle, where different but existing TDD configurations define HARQ/scheduling timing for uplink and downlink. The related decisions after 3GPP RAN1#75 meeting (11-15, Nov. 2013) are summarized below:

For a UE configured with TDD eIMTA, uplink scheduling timing and HARQ timing follow UL-DL configuration signaled in SIB-1;

DL HARQ reference configuration can choose from Rel-8 TDD UL-DL configurations {2, 4, 5};

A subframe configured as DL subframe or DwPTS of special subframe in SIB-1 (in case of PCell) and RadioResourceConfigCommonSCell IE (in case of SCell) should not be used for uplink transmission.

Under any valid UL and DL HARQ reference configurations, the UE should not expect any subframe configured as UL subframe or special subframe in DL HARQ reference configuration is dynamically used as DL subframe.

These decisions may lead to problems with conflicts for HARQ information, as described in more detail below.

BRIEF SUMMARY

This section is meant to be exemplary and is not meant to be limiting.

In an exemplary embodiment, a method, comprises: determining by a base station a first set of physical uplink control channel resources to use for a first set of user equipment to send acknowledgment information to the base station for a first group of downlink subframes, wherein the first set of physical uplink control channel resources starts at a first index; determining by the base station a second set of physical uplink control channel resources to use for a second set of user equipment to send acknowledgment information to the base station for a second group of downlink subframes, wherein the user equipment in the first and second sets of user equipment are different, the second set of physical uplink control channel resources starts at a second index, the user equipment in the first set of user equipment only use the first set of physical uplink control channel resources to send the acknowledgment information to the base station for the first group of downlink subframes, and the user equipment in the second set of user equipment use the first set of physical uplink control channel resources to send the acknowledgment information to the base station for the first group of downlink subframes and use the second set of physical uplink control channel resources to send acknowledgment information to the base station for the second group of downlink subframes; and for an uplink reception by the base station, receiving acknowledgement information from the first user equipment using the first set of physical uplink control channel resources and receiving acknowledgement information from the second user equipment using the first and second sets of physical uplink control channel resources.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

In another exemplary embodiment, an apparatus comprises: means for determining by a base station a first set of physical uplink control channel resources to use for a first set of user equipment to send acknowledgment information to the base station for a first group of downlink subframes, wherein the first set of physical uplink control channel resources starts at a first index; means for determining by the base station a second set of physical uplink control channel resources to use for a second set of user equipment to send acknowledgment information to the base station for a second group of downlink subframes, wherein the user equipment in the first and second sets of user equipment are different, the second set of physical uplink control channel resources starts at a second index, the user equipment in the first set of user equipment only use the first set of physical uplink control channel resources to send the acknowledgment information to the base station for the first group of downlink subframes, and the user equipment in the second set of user equipment use the first set of physical uplink control channel resources to send the acknowledgment information to the base station for the first group of downlink subframes and use the second set of physical uplink control channel resources to send acknowledgment information to the base station for the second group of downlink subframes; and means, for an uplink reception by the base station, for receiving acknowledgement information from the first user equipment using the first set of physical uplink control channel resources and receiving acknowledgement information from the second user equipment using the first and second sets of physical uplink control channel resources.

Another exemplary apparatus includes one or more processors and one or more memories including computer program code. The one or more memories and the computer program code are configured to, with the one or more processors; cause the apparatus to perform at least the following: determining by a base station a first set of physical uplink control channel resources to use for a first set of user equipment to send acknowledgment information to the base station for a first group of downlink subframes, wherein the first set of physical uplink control channel resources starts at a first index; determining by the base station a second set of physical uplink control channel resources to use for a second set of user equipment to send acknowledgment information to the base station for a second group of downlink subframes, wherein the user equipment in the first and second sets of user equipment are different, the second set of physical uplink control channel resources starts at a second index, the user equipment in the first set of user equipment only use the first set of physical uplink control channel resources to send the acknowledgment information to the base station for the first group of downlink subframes, and the user equipment in the second set of user equipment use the first set of physical uplink control channel resources to send the acknowledgment information to the base station for the first group of downlink subframes and use the second set of physical uplink control channel resources to send acknowledgment information to the base station for the second group of downlink subframes; and for an uplink reception by the base station, receiving acknowledgement information from the first user equipment using the first set of physical uplink control channel resources and receiving acknowledgement information from the second user equipment using the first and second sets of physical uplink control channel resources.

In a further exemplary embodiment, a method comprises: determining configuration of physical uplink control channel resources corresponding to two different groups of downlink subframes, wherein a first group includes a first set of downlink subframes and a second group includes a second set of downlink subframes; determining a starting point of a first set of physical uplink control channel resources to be used for transmitting acknowledgement information for downlink subframes in the first set of downlink subframes; determining a starting point of a second set of physical uplink control channel resources to be used for transmitting acknowledgement information for downlink subframes in the second set of downlink subframes; for a given downlink subframe, receiving information on a physical downlink control channel, which schedules physical downlink shared channel data, and performing the following: determining to which group of the groups of subframes the given downlink subframe belongs, and for the given downlink subframe, determining an index of a lowest control channel element of the scheduling physical downlink control channel; based on at least physical uplink control channel resource configuration, the index of the lowest control channel element, a current subframe index, the determined group, and the determined starting points, determining one or more physical uplink control channel resources for acknowledgement transmission corresponding to the received physical downlink shared channel data; and transmitting, using one or both of the starting points for the first and second set of physical uplink control channel resources, acknowledgement information on the determined one or more physical uplink control channel resources.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

A further exemplary embodiment is an apparatus comprising: means for determining configuration of physical uplink control channel resources corresponding to two different groups of downlink subframes, wherein a first group includes a first set of downlink subframes and a second group includes a second set of downlink subframes; means for determining a starting point of a first set of physical uplink control channel resources to be used for transmitting acknowledgement information for downlink subframes in the first set of downlink subframes; means for determining a starting point of a second set of physical uplink control channel resources to be used for transmitting acknowledgement information for downlink subframes in the second set of downlink subframes; means, for a given downlink subframe, for receiving information on a physical downlink control channel, which schedules physical downlink shared channel data, and means for performing the following: determining to which group of the groups of subframes the given downlink subframe belongs, and for the given downlink subframe, determining an index of a lowest control channel element of the scheduling physical downlink control channel; means, based on at least physical uplink control channel resource configuration, the index of the lowest control channel element, a current subframe index, the determined group, and the determined starting points, for determining one or more physical uplink control channel resources for acknowledgement transmission corresponding to the received physical downlink shared channel data; and means for transmitting, using one or both of the starting points for the first and second set of physical uplink control channel resources, acknowledgement information on the determined one or more physical uplink control channel resources.

An exemplary apparatus includes one or more processors and one or more memories including computer program code. The one or more memories and the computer program code are configured to, with the one or more processors, cause the apparatus to perform at least the following: determining configuration of physical uplink control channel resources corresponding to two different groups of downlink subframes, wherein a first group includes a first set of downlink subframes and a second group includes a second set of downlink subframes; determining a starting point of a first set of physical uplink control channel resources to be used for transmitting acknowledgement information for downlink subframes in the first set of downlink subframes; determining a starting point of a second set of physical uplink control channel resources to be used for transmitting acknowledgement information for downlink subframes in the second set of downlink subframes; for a given downlink subframe, receiving information on a physical downlink control channel, which schedules physical downlink shared channel data, and performing the following: determining to which group of the groups of subframes the given downlink subframe belongs, and for the given downlink subframe, determining an index of a lowest control channel element of the scheduling physical downlink control channel; based on at least physical uplink control channel resource configuration, the index of the lowest control channel element, a current subframe index, the determined group, and the determined starting points, determining one or more physical uplink control channel resources for acknowledgement transmission corresponding to the received physical downlink shared channel data; and transmitting, using one or both of the starting points for the first and second set of physical uplink control channel resources, acknowledgement information on the determined one or more physical uplink control channel resources.

BRIEF DESCRIPTION OF THE DRAWINGS

In the attached Drawing Figures:

FIG. 2 illustrates a table (Table 1) for downlink association set index K: $\{k_0, k_1, \ldots k_{M-1}\}$ for TDD and is a copy of Table 10.1.3.1-1 from 3GPP TS 36.213 V11.3.0 (2013-06);

FIG. 3 illustrates downlink HARQ-ACK timing in an example;

FIG. 4A illustrates PUCCH HARQ-ACK resource collisions between legacy users and eIMTA users, where SIB-1 signaled UL-DL configuration is #4, and where the DL HARQ reference configuration is #5;

FIG. 4B illustrates mapping between PDCCH resources and logical PUCCH resources;

FIG. 5B illustrates an example of mapping between PDCCH resources and logical PUCCH resources;

FIG. 6 is a table (Table 2) for eIMTA downlink association set index $K_A$: $\{k_0, k_1, \ldots k_{M_A-1}\}$ for PUCCH resource allocation for Group A downlink subframes;

FIG. 7 is a table (Table 3) for eIMTA downlink association set index $K_B$: $\{k_0, k_1, \ldots k_{M_B-1}\}$, for PUCCH resource allocation for Group B downlink subframes;

FIG. 8 is a table (Table 4) for eIMTA downlink association set for HARQ-ACK bit indexing K: $\{k_0, k_1, \ldots k_{M-1}\}$ for TDD;

FIG. 9 is Table 4.2-2, entitled "Uplink-downlink configurations", from 3GPP TS 36.211 V12.0.0 (2013-12);

DETAILED DESCRIPTION OF THE DRAWINGS

The exemplary embodiments herein describe, e.g., PUCCH resource allocation and use, e.g., for TDD eIMTA. Additional description of these techniques is presented after a system into which the exemplary embodiments may be used is described.

Figure 1:
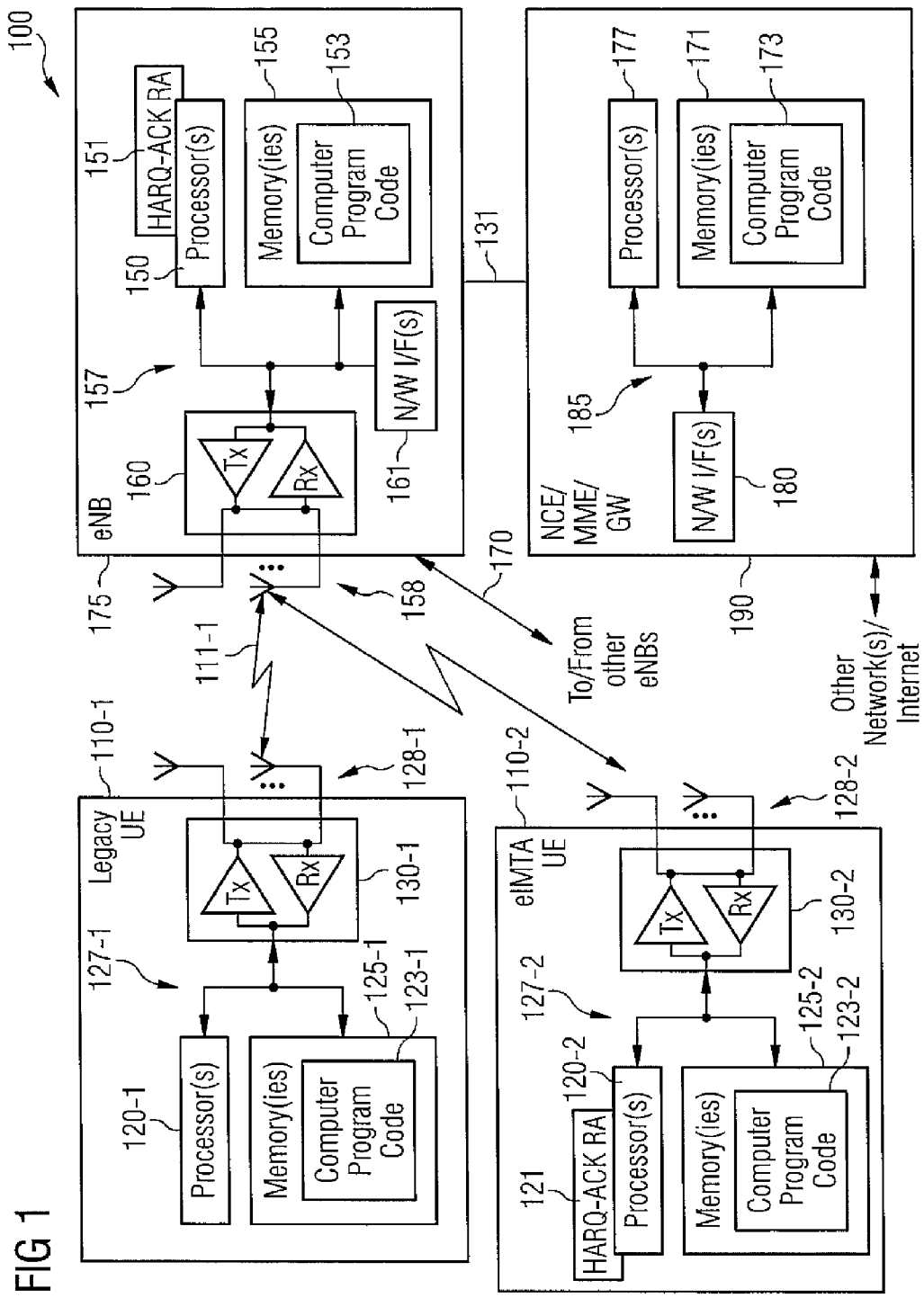
FIG. 1 is a block diagram of an exemplary system in which the exemplary embodiments may be practiced.

Turning to FIG. 1, this figure shows a block diagram of an exemplary system in which the exemplary embodiments may be practiced. In FIG. 1, a legacy UE 110-1 and an eIMTA UE 110-2 are in wireless communication with a network 100. Each of the user equipment 110 includes one or more processors 120, one or more memories 125, and one or more transceivers 130 (comprising one or more transmitters, Tx, and one or more receivers, Rx) interconnected through one or more buses 127. The one or more transceivers 130 are connected to one or more antennas 128. The one or more memories 125 include computer program code 123. The legacy UE 110-1 communicates with eNB 175 via wireless link 111-1, and the eIMTA UE 110-2 similarly communicates with eNB 175 via wireless link 111-2. The eIMTA UE 110-2 includes a HARQ-ACK RA (Resource Allocation) unit 121, which causes the eIMTA UE 110-2 to perform the operations described herein. In an exemplary embodiment, the one or more memories 125-2 and the computer program code 123-2 are configured, with the one or more processors 120-2, to cause the user equipment 110-2 to perform one or more of the operations as described herein. The computer program code 123 can be code that forms the HARQ-ACK RA unit 121. In another example, the HARQ-ACK RA unit 121 is formed at least in part as circuitry, e.g., in the one or more processors 120-2. As described in more detail below, the exemplary embodiments herein concern possible resource collisions between the UEs 110-1 and 110-2 while using UL communications on the wireless links 111.

The eNB 175 includes one or more processors 150, one or more memories 155, one or more network interfaces (N/W I/F(s)) 161, one or more transceivers 160 (comprising one or more transmitters, Tx, and one or more receivers, Rx), and one or more network (N/W) interfaces (I/Fs) 161, interconnected through one or more buses 157. The one or more transceivers 160 are connected to one or more antennas 158. The one or more memories 155 include computer program code 153. The eNB 175 further includes a HARQ-ACK RA unit 151 that causes the eNB 175 to perform operations as described herein. In an exemplary embodiment, the one or more memories 155 and the computer program code 153 are configured to, with the one or more processors 150, cause the eNB 175 to perform one or more of the operations as described herein. In another example, the HARQ-ACK RA unit 151 is formed at least in part as circuitry, e.g., in the one or more processors 150. The one or more network interfaces 161 communicate over a network such as the networks 170 and 131. Two or more eNBs 175 communicate using, e.g., network 170. The network 170 may be wired or wireless or both and may implement, e.g., an X2 interface.

The wireless network 100 may include a network control element (NCE) 190 that may include MME/SGW functionality, and which provides connectivity with a further network, such as a telephone network and/or a data communications network (e.g., the Internet). The eNB 175 is coupled via a network 131 to the NCE 175. The network 131 may be implemented as, e.g., an S1 interface. The NCE 190 includes one or more processors 177, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 177 may be of any type suitable to the local technical environment, and may include one or more of general purpose computers, special purpose computers, microprocessors, digital signal processors (DSPs) and processors based on a multi-core processor architecture, integrated circuits (e.g., designed to carry out one or more of the operations herein), and programmable modules such as field-programmable gate arrays (e.g., designed to carry out one or more of the operations herein), as non-limiting examples. Thus, the exemplary embodiments herein may be performed by the one or more memories 125 and the computer program code 123 being configured, with the one or more processors 120, to cause the UE to perform the operations herein, may be performed by hardware (e.g., embodied in the one or more processors 120) such as integrated circuits and/or programmable modules, or by some combination of these.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As previously stated, exemplary embodiments herein concern PUCCH resource allocation and use, e.g., for TDD eIMTA. Additional description of problems with conventional systems is first presented, and then exemplary embodiments are presented.

A TD-LTE specification defines PUCCH HARQ timing by means of a DL association set as illustrated by the table (Table 1) shown in FIG. 2, which is a table for downlink association set index K: $\{k_0, k_1, \ldots k_{M-1}\}$ for TDD and is a copy of Table 10.1.3.1-1 from 3GPP TS 36.213 V11.3.0 (2013-06). In current specifications (without the eIMTA feature), fixed downlink association sets for UL subframes are defined for each UL-DL configuration. The HARQ feedback for downlink subframes in the same bundling window will be fed back in the predefined uplink subframe according to Table 1 shown in FIG. 2.

In the current specifications (up to Release-11), the PUCCH HARQ-ACK resources are implicitly determined based on the lowest CCE of the corresponding PDCCH/EPDCCH and semi-statically configured PUCCH Format 1/1a/1b starting position along with some other parameters. Furthermore, in TDD mode there is a separate timing offset defined as a function of SIB-1 configuration and the subframe index. From HARQ/timing point of view, the eIMTA feature will create two parallel sets of UEs sharing the same PUCCH Format 1/1a/1b resources:
 Legacy UEs following HARQ/scheduling timing according to SIB-1 configuration; and
 eIMTA UEs following HARQ/scheduling timing according to a DL reference configuration.

This will create PUCCH resource collision and/or PUCCH overhead problems (as depicted in more detail below), which should be avoided by proper system design.

More specifically, based on current 3GPP agreements, if the eIMTA feature is enabled, an eIMTA UE 110-2 will assume that timing of DL HARQ-ACK (transmitted via UL) will follow a DL reference configuration, i.e., configuration 2, 4, or 5, irrespective of SIB-1 UL/DL configuration or the dynamically signaled configuration. Hence, in a given cell, the legacy UEs and eIMTA UEs may have different DL HARQ-ACK timing as illustrated in the example of FIG. 3:
 eIMTA UEs operate according to UL/DL configuration #5 (DL HARQ reference configuration); and
 Legacy UEs operate according to UL/DL configuration #4 (SIB-1 defined UL/DL configuration).

This will create a situation where PUCCH resources corresponding to two UE types will overlap. The problem is shown in FIG. 3.

The DL association set (see the table in FIG. 2) defines for each UL subframe n the timing and the order in which the HARQ-ACK feedback for each DL/Special subframe is transmitted. The example shown in FIG. 3 is the following:
 With UL/DL configuration #4 and UL subframe #2, the PUCCH carries the HARQ-ACK(s) for DL data transmissions, i.e., PDSCH transport blocks, which were received 12, 8, 7 or 11 subframes earlier (that is, earlier than the current subframe #2), i.e., the HARQ delay in this case is at least 7 subframes.
 Similarly, for UL/DL configuration #5 and UL subframe #2, the PUCCH carries the HARQ-ACK(s) for DL data transmissions, which were received 13, 12, 9, 8, 7, 5, 4, 11 or 6 subframes earlier (that is, earlier than the current subframe #2).
 Now, following current resource allocation rules, there will be an overlapping HARQ-ACK resource space defined for eIMTA UEs (subframe offset values 13, 12, 9, 8, 7, 5, 4, 11, 6) and legacy UEs (subframe offset values 12, 8, 7, 11).

In Rel-8/9/10/11 TDD operation, PUCCH resources HARQ-ACKs corresponding to multiple DL data transmissions are concatenated and interleaved in the associated UL subframe (e.g., with 40 CCEs per DL subframe and M=2, 80 PUCCH resources are reserved), so that there are no resource collisions between different subframes. To be specific, the PDCCH resources corresponding to PDCCH OFDM symbols [s1, s2, s3, . . . ] and subframes [SF1, SF2, SF3, . . . ] are mapped to PUCCH in the following order:
 SF1-s1
 SF2-s1
 SF3-s1
 . . .
 SF1-s2
 SF2-s2
 SF3-s2
 . . .

This principle is referred to as block interleaving. While block interleaving is clearly beneficial from the legacy UE 110-1 point of view, block interleaving imposes certain challenges with respect to eIMTA UEs 110-2. FIG. 4A further illustrates the implicit PUCCH resource allocation problem assuming DL reference configuration #5. It can be assumed that a resource overlapping problem related to the 1st (first) PDCCH OFDMA symbol 410-1 is already solved. More particularly, FIG. 2 provides the HARQ-ACK bits ordering according to SIB-1 configuration ([12, 8, 7, 11]). In the example in FIG. 4A, SIB-1 configuration is number 4 and DL HARQ reference configuration is number 5. There are PUCCH resources 510 for a legacy system and PUCCH resources 511 for eIMTA. There are HARQ entries corresponding to 9 DL subframes fed back in one UL subframe at most, if the HARQ bits ordering simply follows configuration #5, that is, [13, 12, 9, 8, 7, 5, 4, 11, 6] for eIMTA UEs. Thus, PUCCH resources will collide even if derived in the first PDCCH OFDM symbol, because HARQ-ACK ordering is [12, 8, 7, 11] for the legacy UE 110-1. With a previous, conventional technique it was proposed to re-order the HARQ-bits as [12, 8, 7, 11, 13, 5, 4, 6, 9], and therefore the PUCCH resource (derived from first PDCCH OFDM symbol) collision can be avoided. The example in FIG. 4A is based on the conventional techniques used until the instant examples. However, if the existing block interleaving was applied as such for eIMTA UEs, there would inevitably be resource collision at least for PUCCH resources corresponding to the 2nd (second) PDCCH OFDM symbol 410-2 and 3rd (third) PDCCH OFDM symbol 410-3. Therefore, there is a need to consider more advanced resource allocation methods avoiding resource collisions or excessive PUCCH overhead.

FIG. 4B illustrates mapping between PDCCH resources and logical PUCCH resources. As is known, PDCCH includes control channel elements (CCE) indexed 0 . . . X (where X can be up to ~80 when there are 3 PDCCH OFDM symbols). A PDCCH is used to schedule, e.g., PDSCH data. There are multiple subframes shown in downlink, but only a single subframe shown in uplink. The PUCCH resources for HARQ-ACK corresponding to PDSCH data depends on the following:

1) The index of the lowest CCE of the PDCCH scheduling the PDSCH;
2) The PDCCH OFDM symbol in which the scheduling PDCCH was transmitted; and/or
3) The subframe in which the scheduling PDCCH was transmitted (e.g., as in TDD HARQ-ACK for multiple DL subframes is sometimes transmitted during the same UL subframe).

Figure 4C:
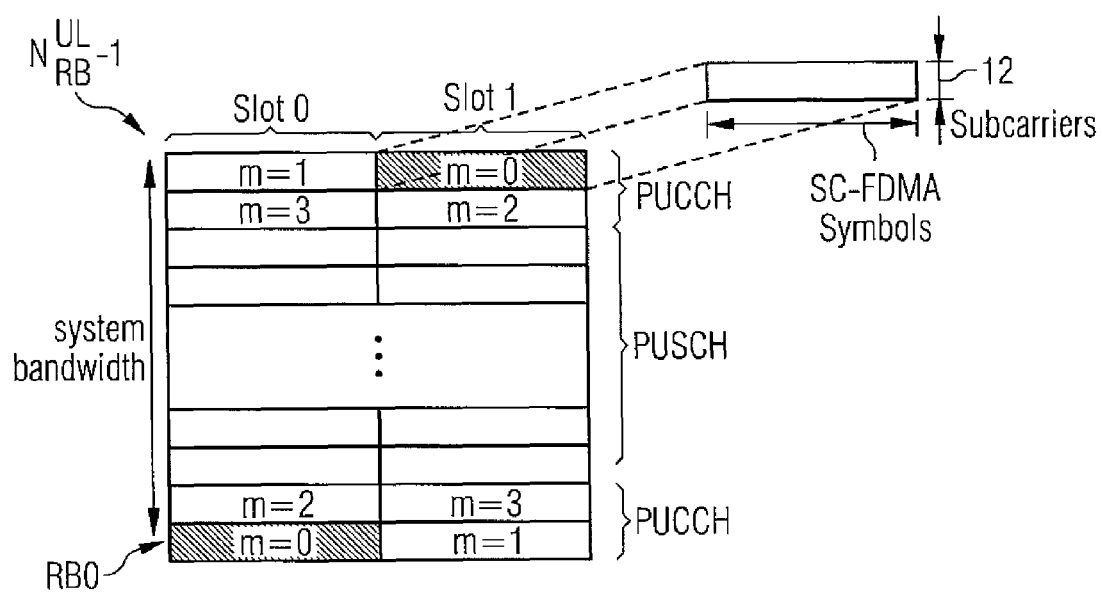
FIG. 4C illustrates mapping of logical PUCCH RBs into physical RBs.

It is further noted that logical PUCCH RBs are mapped into physical RBs. This is illustrated by FIG. 4C, which shows the PUCCH at edges of the system bandwidth for UL. The system bandwidth starts are resource block zero (RB0) and ends at resource block $N_{RB}^{UL}-1$. This example uses an $N_{RB}^{PUCCH}=4$. There are two slots, each slot being a resource block having 12 subcarriers and a number of SC-FDMA symbols in this example. The number of SC-FDMA symbols could be 14 SC-FDMA symbols in a PRB for a case with normal cyclic prefix length, or for a case with extended CP, there are 12 SC-FDMA symbols per PRB. The OFDM symbols 410-1, 410-2, and 410-3 can be used to derive the PUCCH resource block implicitly.

Some companies had identified that mechanisms are required to improve the HARQ-ACK resource allocation in their contributions. Such possible options proposed by these companies and their problems are as follows.

Option 1, explicit resource allocation: This is a straight forward option, where the PUCCH HARQ-ACK resources for legacy and eIMTA are explicitly signaled to the UE via, e.g., RRC-configuration. A problem with this option is that is fairly static: it is not possible to adjust the PUCCH resource dynamically and, in order to avoid collisions, dedicated resources will in practice be needed for all UEs, increasing the PUCCH overhead significantly.

Option 2, partially implicit and partially explicit resource allocation: The resource for DL subframes which is non-overlapping with SIB-1 DL subframe is separated from the legacy resource. A problem for this option is bundle window size is dependent on SIB-1 configuration, then a resource will be allocated to the UL subframe in a current updated configuration, causing PUCCH resource waste and performance loss.

Option 3: U.S. application No. 61/883,469, filed on Sep. 27, 2013, now U.S. patent Ser. No. 14/475,797, filed on Sep. 3, 2014, provided a method to solve the PUCCH resource collision issue (e.g., a resource overlapping problem). With this option, in exemplary embodiments, PUCCH resources corresponding to different DL subframes are arranged according to the DL subframe type. Legacy SIB-1 DL subframes are allocated, e.g., to the first PUCCH resources, followed by other SIB-1 DL subframes and flexible subframes. Correspondingly, a DL association set will be updated with different ordering from current specifications. This option can be seen, e.g., as optimal for the case when EPDCCH is used for DL scheduling. However, with PDCCH, as the resource allocation also depends on the index of the OFDMA symbol carrying the PDCCH, this option becomes potentially sub-optimal as shown in FIG. 4A.

The exemplary embodiments herein may ameliorate or solve these problems. An exemplary embodiment involves dividing the downlink subframes into two groups for the purpose of resource allocation. These groups are called Group A and Group B.

1) The Group A includes in an exemplary embodiment subframes defined as DL or special sub frames by DL HARQ reference configuration, and that are associated with the same UL subframe (e.g., subframe n in FIG. 2 for instance) as the SIB-1 configured DL or special subframes with the same subframe offset (e.g., same value of n–k in FIG. 2 for instance); and
2) The Group B includes, e.g., other DL, special or flexible subframes according to DL HARQ reference configuration.

An exemplary embodiment is to define separate PUCCH resources and downlink association set tables for legacy (e.g., Group A), e.g., when eIMTA is not operated, and other, non-legacy DL subframes (e.g., Group B), respectively, when eIMTA is operated.

One further aspect is that the starting point for the PUCCH resources for the HARQ-ACKs of DL subframes belonging to Group B is different from the starting point of Group A subframes. This can be achieved in the following, alternative ways:

1). The UE can determine the starting point for the eIMTA DL subframe resources for the Group B subframes based on the CFI (Carrier Format Indicator) signaled via PCFICH. Knowing the CFI for each DL subframe in Group A, the eIMTA UE 110-2 knows how many PUCCH HARQ-ACK resources are reserved for Group A. The PUCCH resources for Group B follow directly after Group A.

2) The starting point for the eIMTA DL subframe resources for the Group B subframes can be signaled to the UE by the eNodeB via higher layers (e.g., dedicated or common RRC signaling). The signaling can be absolute (i.e., an integer number indicating the starting resource for Group B). Alternatively, the signaling may be relative to DL subframes in Group A and/or the starting point of the PUCCH resources for Group A. One example of such signaling is that the eNB configures for the UEs a value to assume for CFI in determining the size of the PUCCH region (e.g., number of resources) for Group A.

3) The starting point for the eIMTA DL Group B subframe resources can be predetermined, and directly follow the legacy DL subframe resources (i.e., Group A), assuming a predetermined CFI value (i.e., 1, 2, 3, or 4).

One further exemplary option is to define different block interleaving strategies for subframes belonging to Group A and Group B:

Group A applies block interleaving according to legacy UEs;

Group B may or may not apply block interleaving (e.g., this can be defined also as a configuration parameter for an eNB).

An interleaving example is as follows. Assume that there are three values in DL association set for Group B/subframe n: [7, 8, 4]. Assume that two OFDMA symbols are used for PDCCH (s1 and s2). Block interleaving creates the following ordering: [$7_{s1}$, $8_{s1}$, $4_{s1}$, $7_{s2}$, $8_{s2}$, $4_{s2}$]. No block interleaving creates the following ordering: [$7_{s1}$, $7_{s2}$, $8_{s1}$, $8_{s2}$, $4_{s1}$, $4_{s2}$].

Figure 5A:
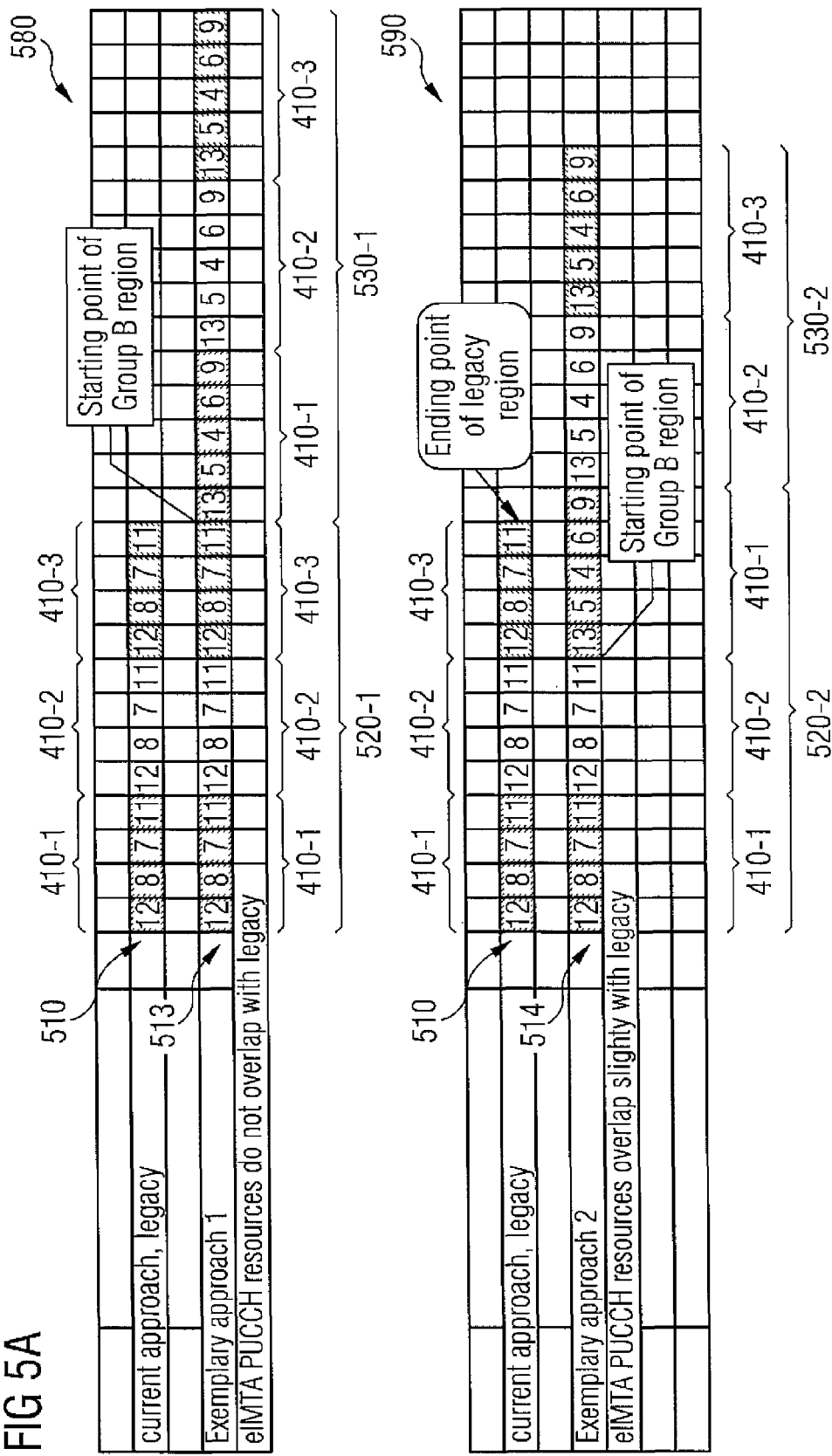
FIG. 5A illustrates two examples of how to configure resources for eIMTA PUCCH resources, where SIB-1 UL-DL configuration #4 and DL HARQ reference configuration #5 are assumed.

FIG. 5A illustrates two examples of how the two sets of PUCCH resources can be configured. FIG. 5A considers the same example as in FIG. 4A (i.e. SIB-1 configuration is number 4, DL HARQ reference configuration is number 5 and n=2). Both examples assume that block interleaving is applied for Group A and Group B. A current legacy approach is illustrated by PUCCH resources 510, a first exemplary approach is illustrated by PUCCH resources 513, and a second exemplary approach is illustrated by PUCCH resources 514. The upper part 580 of FIG. 5A corresponds to a situation where the PUCCH resources corresponding to Group A and Group B downlink subframes do not overlap at all. That is, the PUCCH resources 520-1 which are used for both the legacy UEs and eIMTA UEs do not overlap the PUCCH resources 530-1 which are used for the eIMTA UEs only, since the resources 530-1 begin after the PUCCH resources 520-1. This can be achieved, e.g., by defining that the starting offset for Group B is calculated assuming CFI=3 for all the DL subframes in Group A.

FIG. 5B illustrates an example of mapping between PDCCH resources and logical PUCCH resources, as proposed by the upper part 580 of FIG. 5A. FIG. 5B is similar to FIG. 4B. In the example of FIG. 5B, eIMTA PUCCH resource 530-1 do not overlap with legacy PUCCH resources 510 (and 520-1).

In the lower part 590 of FIG. 5A, some overlap between the legacy PUCCH resources (Group A) 510 and the eIMTA PUCCH resources (Group B) 520-1 is allowed. That is, eIMTA Group B resources 530-2 may overlap with the legacy Group A resources 510 that correspond to the 3rd PDCCH OFDM symbol 410-3 for the resources 510 (or what is shown as PUCCH resources corresponding to the 1st PDCCH OFDM symbol 410-1 for the eIMTA Group B resources 530-2). The starting point of the Group B resources (via resources 530-2) overlaps the ending point of the legacy resources (via resources 510). This option can be beneficial in providing a trade-off between PUCCH overhead and avoiding resource collisions. That is, there is a trade-off between collision avoidance and overhead, i.e., if collisions must always be avoided, there cannot be any resource overlap between legacy and Group B resources, but this increases overhead.

In the following, examples are of possible anticipated specification impact. These assume that block interleaving is applied for both Group A and Group B.

Instead of a single downlink association set table (i.e., Table 10.1.3.1-1 in TS 36.213), two or three tables may be defined. The downlink association set tables for different DL subframes belonging to Group A and Group B, are presented in Table 2 and Table 3, in FIGS. 6 and 7, respectively. Note that some of the entries in Table 2 are in parentheses, such as "(6)" in subframe 2 for UL-DL configuration given by SIB-1 of 0 (zero) and a DL HARQ reference configuration of 4. This represents a case when there exist subframe indexes in the DL association set corresponding to SIB-1 UL-DL configuration, which are not present in the DL association set corresponding to the DL reference UL-DL configuration. In this case, an eIMTA UE 110-2 needs to reserve the PUCCH resources for the subframe indicated in the brackets (e.g., parentheses), but should not map any HARQ-ACK onto those resources to avoid resource collisions. More specifically, in order to avoid collisions with legacy UEs, the table in FIG. 6 should have its entries in the same order as the table in FIG. 2. There are some problematic cases though, where for a PDCCH (and PDSCH) transmitted in a given subframe, the HARQ delay is different between the SIB-1 based legacy UL-DL configuration and the DL reference configuration. The entry (6) is such a case.

In an exemplary embodiment, new bundling window parameters $M_A$ and $M_B$ are defined for Group A subframes and other Group B subframes according to Tables 2 and 3, respectively (from the sake of HARQ-ACK resource allocation, it may be sufficient to define the new bundling window parameter only for Group A). For the PUCCH resource allocation use case, the bundling window parameters $M_A$ and $M_B$ are simply the number of indices in each entry of the table, including the bracketed ones (that is, the entries in parentheses, such as "(6)"). For some other use cases, e.g., for HARQ-ACK bit ordering on PUSCH/PUCCH Format 3, the bundling window parameters $M_A$ and $M_B$ are the number of indices in each entry of the table, excluding the bracketed ones. So for SIB-1 configuration 2 and DL-HARQ reference configuration 2 and subframe 2, $M_A=4$ and $M_B=0$. The PUCCH resource is derived from Tables 2 and 3.

The HARQ-bit ordering follows the following principle in an exemplary embodiment:

HARQ-ACK bits of Group A first, followed by
HARQ-ACK bits of Group B.

Table 4, shown in FIG. 8, is constructed based on Tables 2 and 3 and presents one way of specifying the HARQ-ACK bit ordering. For instance, FIG. 8 shows an order of "6, 7, 8, 4" for subframe 2 of UL-DL configuration of 0 given by SIB-1 and a DL HARQ reference configuration of 2. The "6" in the order of "6, 7, 8, 4" is from FIG. 6 (Group A) and the "7, 8, 4" in the order of "6, 7, 8, 4" is from FIG. 7 (Group B). As another example, for subframe 3 and UL-DL configuration given by SIB-1 of 1 and the DL HARQ reference configuration of 4, the order is "4, 7, 6, 5". The "7, 6, 5" in the order of "4, 7, 6, 5" is from FIG. 7 (Group B) and the "4" in the order of "4, 7, 6, 5" is from FIG. 6 (Group A).

In addition to above tables, exemplary standards impacts on section 10.1.3.1 in 3GPP TS 36.213 with the proposed exemplary embodiments herein are shown below. It is noted that "[3]" below refers to 3GPP TS 36.211 V12.0.0 (2013-12). For ease of reference Table 4.2-2, entitled "Uplink-downlink configurations", from 3GPP TS 36.211 V12.0.0 (2013-12) is reproduced in FIG. 9. Reference may also be made to pages 153 to 159 and section 10.1.3.1, "TDD HARQ-ACK procedure for one configured serving cell", of 3GPP TS 36.213 V12.0.0 (2013-12).

For TDD HARQ-ACK bundling for one serving cell configured with eIMTA, the UE shall use PUCCH resource $n_{PUCCH}^{(i,\tilde{p})}$ for transmission of HARQ-ACK in subframe n for $\tilde{p}$ mapped to antenna port p for PUCCH format 1a/1b, where if there is PDSCH transmission indicated by the detection of corresponding PDCCH/EPDCCH or there is PDCCH/EPDCCH indicating downlink SPS release within subframe(s) n−k, where k∈K and K (defined in Table 4) is a set of M elements $\{k_0, k_1, \ldots k_{M-1}\}$ depending on the subframe n and the SIB-1 UL/DL configuration (defined in Table 4.2-2 in [3]) and DL HARQ reference configuration, and if PDCCH indicating PDSCH transmission or downlink SPS release is detected in subframe n−$k_m$, where $k_m$ is the smallest value in set K such that UE detects a PDCCH/EPDCCH indicating PDSCH transmission or downlink SPS release within subframe(s) n−k and k∈K, the UE first selects a c value out of $\{0, 1, 2, 3\}$ which makes $N_c \leq n_{CCE} < N_{c+1}$ and shall use $n_{PUCCH}^{(1,\tilde{p}0)}=(M_X-m-1)\cdot N_c + m\cdot N_{c+1}+n_{CCE}+N_{eIMTA\_PUCCH}$ for antenna port $p_0$, where $N_{PUCCH}^{(1)}$ is configured by higher layers, $N_c=\max\{0, \lfloor [N_{RB}^{DL}\cdot(N_{SC}^{RB}\cdot c-4)]/36 \rfloor\}$, and $n_{CCE}$ is the number of the first CCE used for transmission of the corresponding PDCCH in subframe n−$k_m$ and the corresponding m. When two antenna port transmission is configured for PUCCH format 1a/1b, the PUCCH resource for HARQ-ACK bundling for antenna port $p_1$ is given by $n_{PUCCH}^{(1,\tilde{p}1)}=(M_X-m-1)\cdot N_c + m\cdot N_{c+1}+n_{CCE}+1+N_{eIMTA\_PUCCH}$. If the downlink subframe with index $k_m$ is in Group A, the value of parameter m in formula is replaced with new index defined in Table 2, $M_X=M_A$ and $N_{eIMTA\_PUCCH}=N_{PUCCH}^{(1)}$; If the downlink subframe with index $k_m$ is in Group B, the value of parameter m in formula is replaced with new index defined Table 3, $M_X=M_B$ and $N_{eIMTA\_PUCCH}=N_{PUCCH}^{(1)}+N_{GroupB}\cdot N_{PUCCH}^{(1)}$ and $N_{GroupB}$ are configured by higher layers.

For TDD HARQ-ACK multiplexing and sub-frame n with M>1 and one serving cell configured with eIMTA, where M is the number of elements in the set K defined in Table 4, denote $n_{PUCCH,i}^{(1)}$ as the PUCCH resource derived from sub-frame n−$k_i$ and HARQ-ACK(i) as the ACK/NACK/DTX response from sub-frame n−$k_i$ where $k_i \in K$ (defined in Table 4) and 0≤i≤M−1.

For a PDSCH transmission indicated by the detection of corresponding PDCCH or a PDCCH indicating downlink SPS release in sub-frame n−$k_i$ where $k_i \in K$, the PUCCH resource $n_{PUCCH,i}^{(1)}=(M_X-i-1)\cdot N_{c,i}+N_{c+1}+n_{CCE,i}+N_{eIMTA\_PUCCH}$, where c is selected from $\{0, 1, 2, 3\}$ such that $N_c \leq n_{CCE,i} < N_{c+1}$, $N_c=\max\{0, \lfloor [N_{RB}^{DL}(N_{SC}^{RB}\cdot c-4)]/36 \rfloor\}$, $n_{CCE,i}$ is the number of the first CCE used for transmission of the corresponding PDCCH in subframe n−$k_i$. If the downlink subframe with index $k_i$ is in Group A, the value of i in parameter $n_{PUCCH,i}^{(1)}$ is not changed, the value of parameter i in other part of the formula is replaced with new index defined in Table 2, $M_X=M_A$ and $N_{eIMTA\_PUCCH}=N_{PUCCH}^{(1)}$; if the downlink sub frame with index $k_i$ is in Group B, the value of i in parameter $n_{PUCCH,i}^{(1)}$ is not changed, the value of parameter i in other part of the formula is replaced with new index defined in Table 3, $M_X=M_B$, and $N_{eIMTA\_PUCCH}=N_{PUCCH}^{(1)}+N_{GroupB}$, and $N_{PUCCH}^{(1)}$ and $N_{GroupB}$ are configured by higher layers.

In the resource allocation formula defining the PUCCH resource for HARQ-ACK, one further term representing the starting point offset for Group B resources is added:

$$n_{PUCCH}^{(1,\tilde{p}0)}=(M_B-m-1)\cdot N_c+m\cdot N_{c+1}+n_{CCE}+N_{PUCCH}^{(1)}+N_{GroupB}.$$

The new offset term $N_{GroupB}$ can be defined in various ways:

The offset can be an integer variable configured via higher layers;

The offset can be determined based on the bundling window size $M_A$ of Group A, number of control channel elements per PDCCH OFDM symbol $N_c$ and an assumption on the CFI for the Group A subframes, e.g., $$N_{GroupB}=M_A*N_c*N_{CFI},$$

where $N_{CFI}$=an integer variable representing the CFI the UE assumes in calculating the starting offset of Group B subframes, and is either predetermined $\{1, 2, 3, \text{or } 4\}$, or signaled via higher layers (e.g., dedicated RRC signaling).

Alternatively, the UE may also determine $N_{GroupB}$ based on the actual CFI signaled via PCFICH and the number of CCEs on each PDCCH OFDM symbol.

Figure 10:
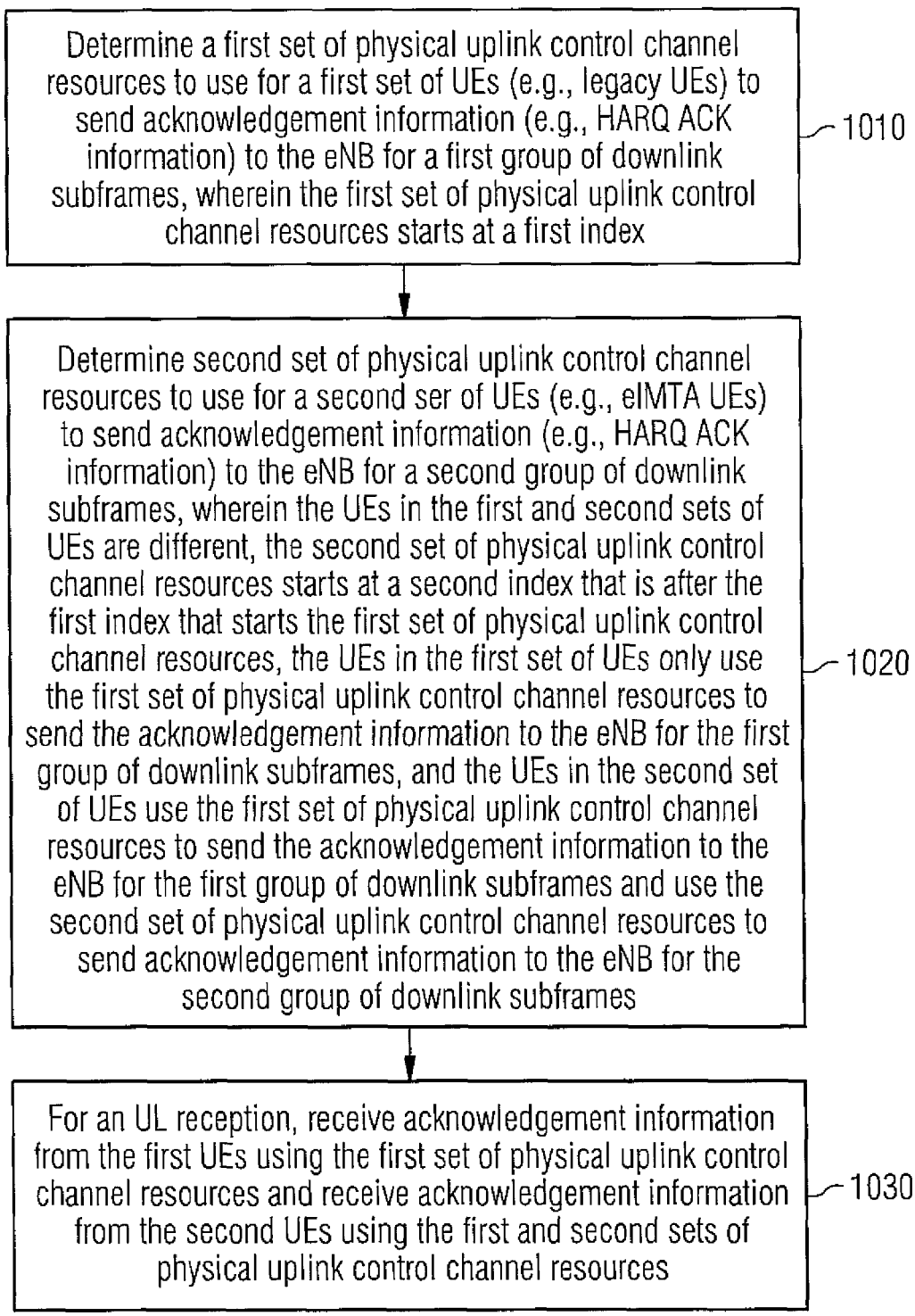
FIG. 10 is a logic flow diagram performed by an eNB for PUCCH resource allocation and use, and illustrates the operation of an exemplary method, a result of execution of computer program instructions embodied on a computer readable memory, and/or functions performed by logic implemented in hardware, in accordance with an exemplary embodiment.

Turning to FIG. 10, this figure is a logic flow diagram performed by an eNB for PUCCH resource allocation and use. This figure also illustrates the operation of an exemplary method, a result of execution of computer program instructions embodied on a computer readable memory, and/or functions performed by logic implemented in hardware, in accordance with an exemplary embodiment. The blocks in the figure may be considered to be interconnected means for performing the functions in the blocks. The blocks in FIG. 10 are performed by an eNB 175, e.g., under the control of the HARQ-ACK RA 151.

In block 1010, the eNB 175 determines a first set of physical uplink control channel resources to use for a first set of UEs (e.g., legacy UEs) to send acknowledgment information (e.g., HARQ ACK information) to the eNB. The first set of physical uplink control channel resources starts at a first index. In block 1020, the eNB 175 determines a second set of physical uplink control channel resources to use for a second set of UEs (e.g., eIMTA UEs) to send acknowledgment information (e.g., HARQ ACK information) to the eNB. The UEs in the first and second sets of UEs are different. The second set of physical uplink control channel resources starts at a second index that may be after (e.g., in terms of logical indexing as illustrated by FIG. 5B, where a value of the first index is less than a value of the second index) the first index that starts the first set of physical uplink control channel resources. The UEs in the first set of UEs only use the first set of physical uplink control channel resources to send the acknowledgment information to the eNB for the first group of downlink subframes. Meanwhile, the UEs in the second set of UEs can use the first set of physical uplink control channel resources to send the acknowledgment information to the eNB for the first group of downlink subframes and can use the second set of physical uplink control channel resources to send acknowledgment information to the eNB for the second group of downlink subframes. In block 1030, the eNB 175, for an UL reception (that is, a reception of information by the eNB of transmission(s) by UEs 110), receives acknowledgement information from the first UEs using the first set of physical uplink control channel resources and receives acknowledgement information from the second UEs using the first and second sets of physical uplink control channel resources.

In another exemplary embodiment, the eNB 175 can determine a location (e.g., corresponding to one of a set of indexes) of the second index and therefore the starting point for the second set of PUCCH resources and signal an indication of the location to the UEs in the second set of UEs. More specifically, the eNB 175 may determine the starting point for the eIMTA DL subframe resources based on a CFI (Carrier Format Indicator). The eNB 175 may signal the CFI to eIMTA UEs via PCFICH.

In another exemplary embodiment, the eNB 175 can determine a location of second index and therefore the starting point for the second set of PUCCH resources and signal an indication of the location to the UEs in the second set of UEs. More specifically, the starting point for the eIMTA DL subframe resources can be signaled by the eNB 175 via higher layers (e.g., dedicated or common RRC signaling). The signaling can be absolute (i.e., an integer number indicating the starting index (e.g., resource) for the UEs in the second set of UEs). Alternatively, the signaling may be relative to DL subframes assigned to UEs in the first set of UEs (i.e. size of Group A) and/or the starting index of the PUCCH set of resources for the UEs in the first set of UEs. One example of such signaling is that the eNB configures for the UEs a value to assume for CFI in determining a size of the PUCCH resources, e.g., the first set of physical uplink control channel resources, for the UEs in the first set of UEs. The size may vary as a function of n (that is, the UL subframe carrying PUCCH). It is noted that the starting point of the legacy (e.g., non-eIMTA) DL subframe resources (e.g., the first set of physical uplink control channel resources) may be signaled by the eNB 175 via higher layers (e.g., dedicated or common RRC signaling).

In a further exemplary embodiment, the starting point for the eIMTA DL subframe resources (e.g., the second set of physical uplink control channel resources) can be predetermined, and directly follow the legacy DL subframe resources (i.e., the first set of physical uplink control channel resources), e.g., assuming a predetermined CFI value (i.e., 1, 2, 3, or 4).

An additional exemplary embodiment has the eNB 175 defining different block interleaving strategies for the first and second sets of UEs:
Block interleaving is applied according to legacy UEs, e.g., the first set of UEs;
Block interleaving may or may not be applied to the UEs in the second set (e.g., eIMTA UEs). This can be defined also as a configuration parameter for an eNB.

In a further exemplary embodiment, the first and second set of the physical uplink control channel resources may overlap, that is, an end of the first set of physical uplink control channel resources may occur in indexes after the second index that starts the second set of physical uplink control channel resources.

In an additional exemplary embodiment, a first table (e.g., FIG. 6) is defined for the UEs in the first set of UEs and a second table (e.g., FIG. 7) is defined for the UEs in the second set of UEs.

In a further exemplary embodiment, a principle is followed that, for a single sub frame, HARQ-ACK bits of the first set of UEs are first in the PUCCH resources, followed by HARQ-ACK bits of the second set of UEs. The first and second tables (e.g., FIGS. 6 and 7) may be used to define a third table (e.g., FIG. 8) specifying the HARQ-ACK bit ordering.

In a further exemplary embodiment, the first group of downlink subframes includes (e.g., is limited to) subframes defined as DL or special subframes by DL HARQ reference configuration, and that are associated with the same UL subframe (e.g., subframe n in FIG. 2 for instance) as the SIB-1 configured DL or special subframes with the same subframe offset (e.g., same value of n–k in FIG. 2 for instance), and the second group of downlink subframes includes (e.g., is limited to) other downlink, special or flexible subframes according to DL HARQ reference configuration.

An additional exemplary embodiment defines the size of the first group ($M_A$), which may be defined based on the size of association set of SIB-1 UL/DL configuration.

Furthermore, the starting position (e.g., index) of the second group may be based on the size of the first group (e.g., among other parameters).

Figure 11:
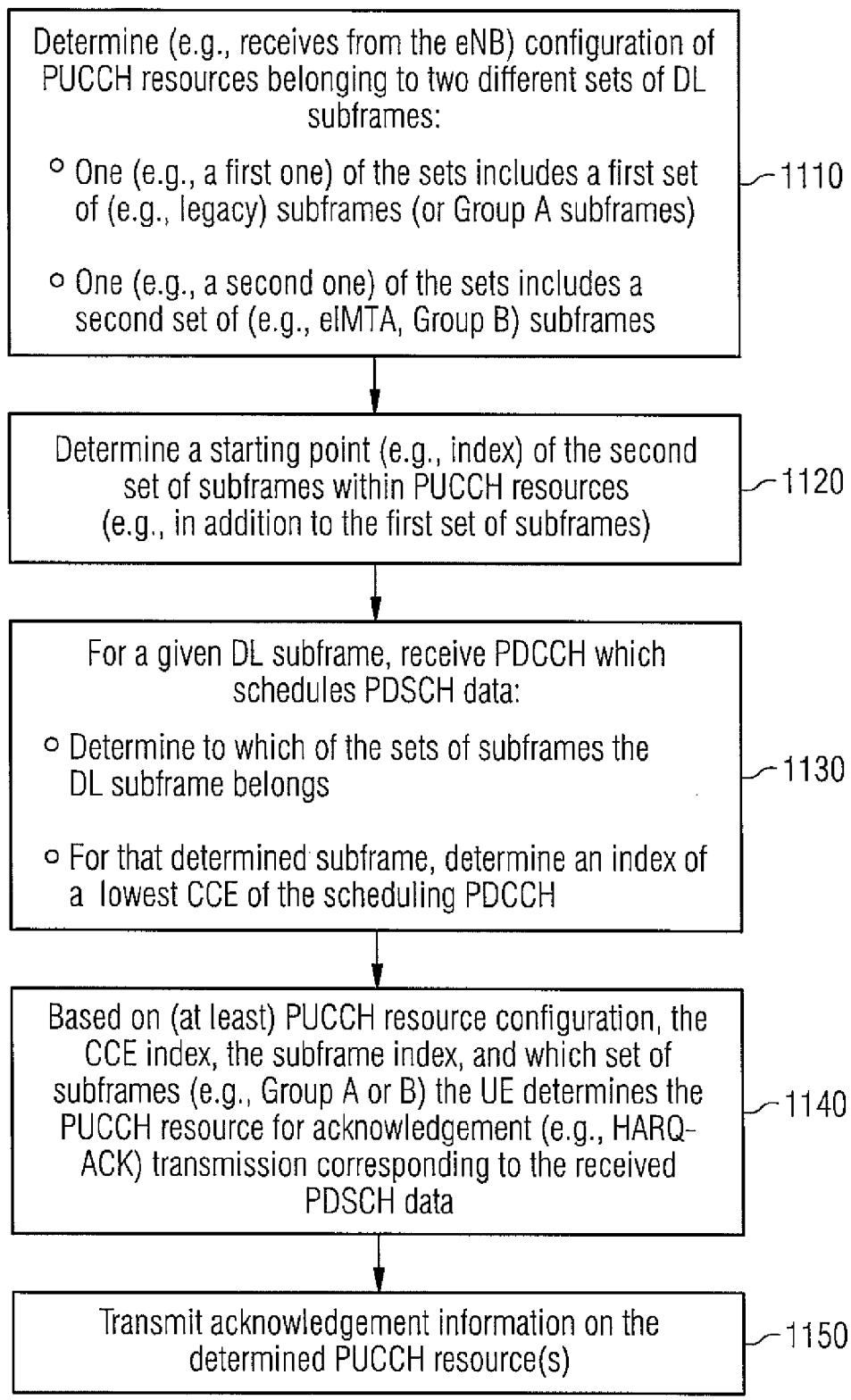
FIG. 11 is a logic flow diagram performed by an eIMTA UE for PUCCH resource allocation and use, and illustrates the operation of an exemplary method, a result of execution of computer program instructions embodied on a computer readable memory, and/or functions performed by logic implemented in hardware, in accordance with an exemplary embodiment.

Turning to FIG. 11, a logic flow diagram is shown that is performed by an eIMTA UE for PUCCH resource allocation and use. FIG. 11 illustrates the operation of an exemplary method, a result of execution of computer program instructions embodied on a computer readable memory, and/or functions performed by logic implemented in hardware, in accordance with an exemplary embodiment. The blocks in FIG. 11 may be considered to be interconnected means for performing the functions in the blocks. FIG. 11 may be assumed to be performed by an eIMTA UE 110-2, e.g., under the control of HARQ-ACK RA (Resource Allocation) unit 121.

In block 1110, the UE 110-2 determines (e.g., receives from the eNB) the configuration of PUCCH resources belonging to two different sets of DL subframes:
One of the sets includes a first set of (e.g., legacy) subframes (or Group A subframes); and
One of the sets includes a second set of (e.g., eIMTA, Group B) sub frames.

In block 1120, the UE determines a starting point (e.g., index) of the second set of subframes (e.g., in addition a starting point for the first set of subframes) within the PUCCH resources. In block 1130, for a given DL subframe, the UE 110-2 receives (from the eNB) PDCCH, which schedules (for instance) PDSCH data and the UE performs the following:
Determines to which of the sets of subframes the given DL subframe belongs; and
For the given DL subframe, determines an index of a lowest CCE of the scheduling PDCCH.

In block 1140, based on (at least) PUCCH resource configuration, the CCE index, the (e.g., current) subframe index (such as the index for Subframe n), which set of subframes (e.g., Group A or B) is being considered, and the starting point(s) of the first and second sets of PUCCH resources, the UE 110-2 determines the PUCCH resource(s) for acknowledgement (e.g., HARQ-ACK) transmission corresponding to the received PDSCH data. In block 1150, the UE 110-2 transmits acknowledgement information on the determined PUCCH resource(s).

It is noted that the UE 110-2 may transmit acknowledgement information (as shown, e.g., in FIG. 5B) for both the first set(s) (e.g., Group A) and second set(s) (Group B) of DL subframes, e.g., using the first and second sets of PUCCH resources and also the starting points for each.

In another exemplary embodiment, the UE 110-2 can determine a location (e.g., corresponding to one of a set of indexes) of the index and therefore the starting point for the second set of PUCCH resources by receiving signaling from the eNB of an indication of the location. More specifically, the starting point for the eIMTA DL subframe resources may be based on a CFI (Carrier Format Indicator) and the UE may receive from the eNB signaling of the CFI via PCFICH.

As another example, the starting point for the eIMTA DL subframe resources (e.g., the second set of physical uplink control channel resources) can be received by the UE from signaling by the eNB 175. The signaling can be absolute (i.e., an integer number indicating the starting index (e.g., resource)). Alternatively, the signaling may be relative to DL subframes assigned to the first set of subframes (i.e. size of Group A) and/or the starting index of the PUCCH set of resources for the first set of subframes. One example of such signaling is a value to assume for CFI in determining a size of the PUCCH resources, e.g., a first set of physical uplink control channel resources. It is noted that the starting point of the legacy (e.g., non-eIMTA) DL subframe resources (e.g., the first set of physical uplink control channel resources) may be received by the UE 110-2 through signaling by the eNB 175 via, e.g., dedicated or common RRC signaling.

In a further exemplary embodiment, the starting point for the eIMTA DL sub frame resources (e.g., the second set of physical uplink control channel resources) can be predetermined, and directly follow the legacy DL subframe resources (i.e., the first set of physical uplink control channel resources), e.g., assuming a predetermined CFI value (i.e., 1, 2, 3, or 4).

An additional exemplary embodiment has different block interleaving strategies for the first and second sets of UEs:
Block interleaving is applied according to legacy UEs, e.g., the first set of UEs;
Block interleaving may or may not be applied to the UEs in the second set (e.g., eIMTA UEs). There are several exemplary possibilities for this. First, the block interleaving strategies may be fixed in a specification, i.e., either with block interleaving or without block interleaving. Another exemplary possibility is for the block interleaving strategy/strategies to be signaled by the eNB to the UE, and then the UE could know whether block interleaving is applied according the signaling received from eNB.

In a further exemplary embodiment, the first and second set of the physical uplink control channel resources may overlap, that is, an end of the first set of physical uplink control channel resources may occur in indexes after the second index that starts the second set of physical uplink control channel resources.

In an additional exemplary embodiment, a first table (e.g., FIG. 6) is defined for PUCCH resource allocation for the first set of DL subframes and a second table (e.g., FIG. 7) is defined for PUCCH resource allocation for the second set of DL subframes.

In a further exemplary embodiment, a principle of HARQ-ACK bits ordering is followed such that HARQ-ACK bits with PUCCH resource allocation in the first set of DL subframes are placed first, followed by HARQ-ACK bits with PUCCH resource allocation in the second set of DL subframes. The first and second tables (e.g., FIGS. 6 and 7) may be used to define a third table (e.g., FIG. 8) specifying the HARQ-ACK bit ordering. This embodiment can apply to ACK/NACK feedback transmitted on PUCCH when configured to PUCCH format 1b with channel selection and ACK/NACK feedback transmitted on PUCCH/PUSCH when configured to PUCCH format 3, based on configuration by the eNB.

In a further exemplary embodiment, the two groups of downlink subframes PUCCH resource allocation and HARQ-ACK bits ordering for TDD eIMTA are not limited to a single carrier case. Instead, these can apply to multiple carrier scenarios, e.g., TDD eIMTA working with carrier aggregation (CA), and also apply to other scenarios, e.g., TDD eITMA working with Coordinated Multi-Point (CoMP) transmission and reception.

In a further exemplary embodiment, the first group of downlink subframes includes (e.g., is limited to) subframes defined as DL or special subframes by DL HARQ reference configuration, and that are associated with the same UL subframe (e.g., subframe n in FIG. 2 for instance) as the SIB-1 configured DL or special subframes with the same subframe offset (e.g., same value of n−k in FIG. 2 for instance), and the second group of downlink subframes includes (e.g., is limited to) other downlink, special or flexible subframes according to DL HARQ reference configuration.

Exemplary and non-limiting advantages and technical effects include but are not limited to the following:

1) The proposed implementations are fully backwards compatible, which means that resource collisions with non-eIMTA UEs can be avoided completely (e.g., without eNB scheduler based solution/scheduling restrictions).

2) An exemplary advantage is that the proposed implementations minimize the PUCCH resource space and hence the UL, overhead. The PUCCH resources do not need to be dimensioned according to the maximum number of HARQ ACK resources as the unoccupied resources will automatically appear in the end of the PUCCH resources.

3) The smaller number of DL subframes in the selected UL-DL configuration, the smaller number of resources needed for PUCCH.

4) The unoccupied PUCCH resources can be used for PUSCH.

5) The implementation can be handled easily via two or three additional tables in the 3GPP TS 36.213 specification.

6) A solution for eIMTA PUCCH RA should be specified in any case to avoid complex scheduler restrictions.

The following are additional examples. Example 1. A method, comprising: determining by a base station a first set of physical uplink control channel resources to use for a first set of user equipment to send acknowledgment information to the base station for a first group of downlink subframes, wherein the first set of physical uplink control channel resources starts at a first index; determining by the base station a second set of physical uplink control channel resources to use for a second set of user equipment to send acknowledgment information to the base station for a second group of downlink subframes, wherein the user equipment in the first and second sets of user equipment are different, the second set of physical uplink control channel resources starts at a second index, the user equipment in the first set of user equipment only use the first set of physical uplink control channel resources to send the acknowledgment information to the base station for the first group of downlink subframes, and the user equipment in the second set of user equipment use the first set of physical uplink control channel resources to send the acknowledgment information to the base station for the first group of downlink subframes and use the second set of physical uplink control channel resources to send acknowledgment information to the base station for the second group of downlink subframes; and for an uplink reception by the base station, receiving acknowledgement information from the first user equipment using the first set of physical uplink control channel resources and receiving acknowledgement information from the second user equipment using the first and second sets of physical uplink control channel resources.

Example 2. The method of example 1, further comprising the base station signaling an indication of a starting point for the second set of physical uplink control channel resources to the user equipment in the second set of user equipment. Example 3. The method of example 2, wherein signaling further comprises signaling by the base station by dedicated or common radio resource control signaling. Example 4. The method of example 3, wherein the signaling is absolute and indicates an integer number indicating a starting index for the user equipment in the second set of user equipment. Example 5. The method of example 3, wherein the signaling is relative and indicates an integer relative to a number of downlink subframes assigned to the user equipment in the first set of user equipment or relative to a starting index of the physical uplink control channel set of resources for the user equipment in the first set of user equipment, or relative to both the number of downlink subframes assigned to the user equipment in the first set of user equipment and to the starting index of the physical uplink control channel set of resources for the user equipment in the first set of user equipment.

Example 6. The method of any of the preceding examples, wherein the first group of downlink subframes is limited to legacy downlink subframes, and the second group of downlink subframes is limited to non-legacy downlink subframes.

Example 7. The method of example 6, wherein the legacy downlink subframes correspond to subframes defined as downlink or special subframes by downlink hybrid automatic repeat request reference configuration and that are associated with a same uplink subframe as a system information block-1 configured downlink or special sub frames with a same subframe offset, and the non-legacy downlink subframes correspond to other downlink, special or flexible subframes according to downlink hybrid automatic repeat request reference configuration.

Example 8. The method of any of examples 6 or 7, wherein the user equipment in the first set of user equipment and the user equipment in the second set of user equipment use the following table for the first group of downlink subframes:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6 | — | — | — | — | 6 | — | — |
| | 1 | — | — | 7, 6 | — | — | — | — | 7, 6 | — | — |
| | 2 | — | — | 8, 7, 4, 6 | — | — | — | — | 8, 7, 4, 6 | — | — |
| | 3 | | | | invalid | | | | | | |
| | 4 | | | | invalid | | | | | | |
| | 5 | | | | invalid | | | | | | |
| | 6 | — | — | 7 | — | — | — | — | 7 | — | — |
| 4 | 0 | — | — | (6) | — | — | — | — | — | — | — |
| | 1 | — | — | 7, (6) | 4 | — | — | — | — | — | — |
| | 2 | | | | invalid | | | | | | |
| | 3 | — | — | 7, (6), 11 | 6, 5 | — | — | — | — | — | — |
| | 4 | — | — | 12, 8, 7, 11 | 6, 5, 4, 7 | — | — | — | — | — | — |
| | 5 | | | | invalid | | | | | | |
| | 6 | — | — | 7 | 7 | — | — | — | — | — | — |
| 5 | 0 | — | — | 6 | — | — | — | — | — | — | — |
| | 1 | — | — | 7, 6 | — | — | — | — | — | — | — |
| | 2 | — | — | 8, 7, 4, 6 | — | — | — | — | — | — | — |
| | 3 | — | — | 7, 6, 11 | — | — | — | — | — | — | — |
| | 4 | — | — | 12, 8, 7, 11 | — | — | — | — | — | — | — |
| | 5 | — | — | 13, 12, 9, 8, 7, 5, 4, 11, 6 | — | — | — | — | — | — | — |
| | 6 | — | — | 7 | — | — | — | — | — | — | — | and wherein the user equipment in the second set of user equipment use the following table the second group of downlink subframes:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 8, 4 | — | — | — | — | 7, 8, 4 | — | — |
| | 1 | — | — | 8, 4 | — | — | — | — | 8, 4 | — | — |
| | 2 | — | — | — | — | — | — | — | — | — | — |
| | 3 | | | | invalid | | | | | | |
| | 4 | | | | invalid | | | | | | |
| | 5 | | | | invalid | | | | | | |
| | 6 | — | — | 6, 8, 4 | — | — | — | — | 6, 8, 4 | — | — |
| 4 | 0 | — | — | 12, 7, 11, 8 | 7, 6, 5, 4 | — | — | — | — | — | — |
| | 1 | — | — | 12, 8, 11 | 7, 6, 5 | — | — | — | — | — | — |
| | 2 | | | | invalid | | | | | | |
| | 3 | — | — | 12, 8 | 4, 7 | — | — | — | — | — | — |
| | 4 | — | — | — | — | — | — | — | — | — | — |
| | 5 | | | | invalid | | | | | | |
| | 6 | — | — | 12, 11, 8 | 4, 6, 5 | — | — | — | — | — | — |
| 5 | 0 | — | — | 12, 7, 11, 13, 8, 4, 9, 5 | — | — | — | — | — | — | — |
| | 1 | — | — | 13, 12, 8, 11, 4, 9, 5 | — | — | — | — | — | — | — |
| | 2 | — | — | 13, 12, 9, 11, 5 | — | — | — | — | — | — | — |
| | 3 | — | — | 13, 12, 5, 4, 8, 9 | — | — | — | — | — | — | — |
| | 4 | — | — | 13, 5, 4, 6, 9 | — | — | — | — | — | — | — |
| | 5 | — | — | — | — | — | — | — | — | — | — |
| | 6 | — | — | 13, 12, 11, 6, 8, 4, 9, 5 | — | — | — | — | — | — | — | wherein DL is downlink, HARQ is hybrid automatic repeat request, UL is uplink, SIB-1 is system information block-1, Subframe n indicates a subframe used to transmit the acknowledgement information, and each entry for the Subframe n indicates downlink association set indexes in terms of subframes relative to Subframe n for which acknowledgement information may be reported.

Example 9. The method of any of examples 6 to 8, where for a single uplink subframe, bits for the acknowledgement information of the first set of user equipment are first in the physical uplink control channel resources, followed by bits for the acknowledgement information of the second set of user equipment.

Example 10. The method of any of example 9, wherein the following table specifies bit ordering:

subframes in the first set of downlink subframes; determining a starting point of a second set of physical uplink control channel resources to be used for transmitting acknowledgement information for downlink subframes in the second set of downlink subframes; for a given downlink subframe, receiving information on a physical downlink control channel, which schedules physical downlink shared channel data, and performing the following: determining to which group of the groups of subframes the given downlink subframe belongs, and for the given downlink subframe, determining an index of a lowest control channel element of the scheduling physical downlink control channel; based on at least physical uplink control channel resource configuration, the index of the lowest control channel element, a current subframe index, the determined group, and the determined

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6, 7, 8, 4 | — | | — | — | — | 6, 7, 8, 4 | — | — |
| | 1 | — | — | 7, 6, 8, 4 | — | | — | — | — | 7, 6, 8, 4 | — | — |
| | 2 | — | — | 8, 7, 4, 6 | — | | — | — | — | 8, 7, 4, 6 | — | — |
| | 3 | | | | invalid | | | | | | | |
| | 4 | | | | invalid | | | | | | | |
| | 5 | | | | invalid | | | | | | | |
| | 6 | — | — | 7, 6, 8, 4 | — | | — | — | — | 7, 6, 8, 4 | — | — |
| 4 | 0 | — | — | 12, 7, 11, 8 | 7, 6, 5, 4 | — | — | — | — | — | — |
| | 1 | — | — | 7, 12, 8, 11 | 4, 7, 6, 5 | — | — | — | — | — | — |
| | 2 | | | | invalid | | | | | | | |
| | 3 | — | — | 7, 11, 12, 8 | 6, 5, 4, 7 | — | — | — | — | — | — |
| | 4 | — | — | 12, 8, 7, 11 | 6, 5, 4, 7 | — | — | — | — | — | — |
| | 5 | | | | invalid | | | | | | | |
| | 6 | — | — | 7, 12, 11, 8 | 7, 4, 6, 5 | — | — | — | — | — | — |
| 5 | 0 | — | — | 6, 12, 7, 11, 13, 8, 4, 9, 5 | — | — | — | — | — | — | — |
| | 1 | — | — | 7, 6, 13, 12, 8, 11, 4, 9, 5 | — | — | — | — | — | — | — |
| | 2 | — | — | 8, 7, 4, 6, 13, 12, 9, 11, 5 | — | — | — | — | — | — | — |
| | 3 | — | — | 7, 6, 11, 13, 12, 5, 4, 8, 9 | — | — | — | — | — | — | — |
| | 4 | — | — | 12, 8, 7, 11, 13, 5, 4, 6, 9 | — | — | — | — | — | — | — |
| | 5 | — | — | 13, 12, 9, 8, 7, 5, 4, 11, 6 | — | — | — | — | — | — | — |
| | 6 | — | — | 13, 12, 11, 6, 8, 4, 9, 5 | — | — | — | — | — | — | — | wherein DL is downlink, HARQ is hybrid automatic repeat request, UL is uplink, SIB-1 is system information block-1, Subframe n indicates a subframe used to transmit the acknowledgement information, and each entry for the Subframe n indicates downlink association set indexes in terms of subframes relative to Subframe n for which acknowledgement information may be reported and defined the bit ordering.

Example 11. The method of any of the preceding examples, wherein the user equipment in the first set of user equipment are time division duplex user equipment not applying enhanced interference management and traffic adaptation, and wherein the user equipment in the second set of user equipment are time division duplex user equipment applying enhanced interference management and traffic adaptation.

Example 12. A method, comprising: determining configuration of physical uplink control channel resources corresponding to two different groups of downlink subframes, wherein a first group includes a first set of downlink subframes and a second group includes a second set of downlink subframes; determining a starting point of a first set of physical uplink control channel resources to be used for transmitting acknowledgement information for downlink starting points, determining one or more physical uplink control channel resources for acknowledgement transmission corresponding to the received physical downlink shared channel data; and transmitting, using one or both of the starting points for the first and second set of physical uplink control channel resources, acknowledgement information on the determined one or more physical uplink control channel resources.

Example 13. The method of example 12, further comprising receiving from a base station signaling an indication of the starting point for the second set of the physical uplink control channel resources. Example 14. The method of example 13, wherein receiving further comprises receiving the signaling by dedicated or common radio resource control signaling. Example 15. The method of example 14, wherein the signaling is absolute and indicates an integer number indicating a starting index.

Example 16. The method of any of examples 12 to 15, wherein the first group of downlink subframes is limited to legacy downlink subframes, and the second group of downlink subframes is limited to non-legacy downlink subframes. Example 17. The method of example 16, wherein the legacy downlink subframes correspond to subframes defined as downlink or special subframes by downlink hybrid automatic repeat request reference configuration and that are associated with a same uplink subframe as a system information block-1 configured downlink or special subframes with a same subframe offset, and the non-legacy downlink subframes correspond to other downlink, special or flexible subframes according to downlink hybrid automatic repeat request reference configuration.

Example 18. The method of any of examples 16 or 17, performed by a user equipment, wherein the user equipment uses the following table for downlink subframes in the first group:

wherein DL is downlink, HARQ is hybrid automatic repeat request, UL is uplink, SIB-1 is system information block-1, Subframe n indicates a subframe used to transmit the acknowledgement information, and each entry for the Subframe n indicates downlink association set indexes in terms of subframes relative to Subframe n for which acknowledgement information may be reported.

Example 19. The method of any of examples 16 to 18, where for a single subframe, bits for the acknowledgement information of the first set of user equipment are first in the physical uplink control channel resources, followed by bits

| DL HARQ reference configuration | UL-DL Configuration given by SIB-1 | \multicolumn{10}{c}{Subframe n} |
|---|---|---|---|---|---|---|---|---|---|---|---|
|  |  | 0 | 1 | 2 | 3 | 4 | 5 | 6 | 7 | 8 | 9 |
| 2 | 0 | — | — | 6 | — | — | — | — | 6 | — | — |
|  | 1 | — | — | 7, 6 | — | — | — | — | 7, 6 | — | — |
|  | 2 | — | — | 8, 7, 4, 6 | — | — | — | — | 8, 7, 4, 6 | — | — |
|  | 3 |  |  |  | invalid |  |  |  |  |  |  |
|  | 4 |  |  |  | invalid |  |  |  |  |  |  |
|  | 5 |  |  |  | invalid |  |  |  |  |  |  |
|  | 6 | — | — | 7 | — | — | — | — | 7 | — | — |
| 4 | 0 | — | — | (6) | — | — | — | — | — | — | — |
|  | 1 | — | — | 7, (6) | 4 | — | — | — | — | — | — |
|  | 2 |  |  |  | invalid |  |  |  |  |  |  |
|  | 3 | — | — | 7, (6), 11 | 6, 5 | — | — | — | — | — | — |
|  | 4 | — | — | 12, 8, 7, 11 | 6, 5, 4, 7 | — | — | — | — | — | — |
|  | 5 |  |  |  | invalid |  |  |  |  |  |  |
|  | 6 | — | — | 7 | 7 | — | — | — | — | — | — |
| 5 | 0 | — | — | 6 | — | — | — | — | — | — | — |
|  | 1 | — | — | 7, 6 | — | — | — | — | — | — | — |
|  | 2 | — | — | 8, 7, 4, 6 | — | — | — | — | — | — | — |
|  | 3 | — | — | 7, 6, 11 | — | — | — | — | — | — | — |
|  | 4 | — | — | 12, 8, 7, 11 | — | — | — | — | — | — | — |
|  | 5 | — | — | 13, 12, 9, 8, 7, 5, 4, 11, 6 | — | — | — | — | — | — | — |
|  | 6 | — | — | 7 | — | — | — | — | — | — | — | and wherein the user equipment uses the following table for downlink subframes in the second group:

for the acknowledgement information of the second set of user equipment.

| DL HARQ reference configuration | UL-DL Configuration given by SIB-1 | \multicolumn{10}{c}{Subframe n} |
|---|---|---|---|---|---|---|---|---|---|---|---|
|  |  | 0 | 1 | 2 | 3 | 4 | 5 | 6 | 7 | 8 | 9 |
| 2 | 0 | — | — | 7, 8, 4 | — | — | — | — | 7, 8, 4 | — | — |
|  | 1 | — | — | 8, 4 | — | — | — | — | 8, 4 | — | — |
|  | 2 | — | — | — | — | — | — | — | — | — | — |
|  | 3 |  |  |  | invalid |  |  |  |  |  |  |
|  | 4 |  |  |  | invalid |  |  |  |  |  |  |
|  | 5 |  |  |  | invalid |  |  |  |  |  |  |
|  | 6 | — | — | 6, 8, 4 | — | — | — | — | 6, 8, 4 | — | — |
| 4 | 0 | — | — | 12, 7, 11, 8 | 7, 6, 5, 4 | — | — | — | — | — | — |
|  | 1 | — | — | 12, 8, 11 | 7, 6, 5 | — | — | — | — | — | — |
|  | 2 |  |  |  | invalid |  |  |  |  |  |  |
|  | 3 | — | — | 12, 8 | 4, 7 | — | — | — | — | — | — |
|  | 4 | — | — | — | — | — | — | — | — | — | — |
|  | 5 |  |  |  | invalid |  |  |  |  |  |  |
|  | 6 | — | — | 12, 11, 8 | 4, 6, 5 | — | — | — | — | — | — |
| 5 | 0 | — | — | 12, 7, 11, 13, 8, 4, 9, 5 | — | — | — | — | — | — | — |
|  | 1 | — | — | 13, 12, 8, 11, 4, 9, 5 | — | — | — | — | — | — | — |
|  | 2 | — | — | 13, 12, 9, 11, 5 | — | — | — | — | — | — | — |
|  | 3 | — | — | 13, 12, 5, 4, 8, 9 | — | — | — | — | — | — | — |
|  | 4 | — | — | 13, 5, 4, 6, 9 | — | — | — | — | — | — | — |
|  | 5 | — | — | — | — | — | — | — | — | — | — |
|  | 6 | — | — | 13, 12, 11, 6, 8, 4, 9, 5 | — | — | — | — | — | — | — |

Example 20. The method of example 19, wherein the following table specifies bit ordering:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6, 7, 8, 4 | — | — | — | — | 6, 7, 8, 4 | — | — |
| | 1 | — | — | 7, 6, 8, 4 | — | — | — | — | 7, 6, 8, 4 | — | — |
| | 2 | — | — | 8, 7, 4, 6 | — | — | — | — | 8, 7, 4, 6 | — | — |
| | 3 | | | | invalid | | | | | | |
| | 4 | | | | invalid | | | | | | |
| | 5 | | | | invalid | | | | | | |
| | 6 | — | — | 7, 6, 8, 4 | — | — | — | — | 7, 6, 8, 4 | — | — |
| 4 | 0 | — | — | 12, 7, 11, 8 | 7, 6, 5, 4 | — | — | — | — | — | — |
| | 1 | — | — | 7, 12, 8, 11 | 4, 7, 6, 5 | — | — | — | — | — | — |
| | 2 | | | | invalid | | | | | | |
| | 3 | — | — | 7, 11, 12, 8 | 6, 5, 4, 7 | — | — | — | — | — | — |
| | 4 | — | — | 12, 8, 7, 11 | 6, 5, 4, 7 | — | — | — | — | — | — |
| | 5 | | | | invalid | | | | | | |
| | 6 | — | — | 7, 12, 11, 8 | 7, 4, 6, 5 | — | — | — | — | — | — |
| 5 | 0 | — | — | 6, 12, 7, 11, 13, 8, 4, 9, 5 | — | — | — | — | — | — | — |
| | 1 | — | — | 7, 6, 13, 12, 8, 11, 4, 9, 5 | — | — | — | — | — | — | — |
| | 2 | — | — | 8, 7, 4, 6, 13, 12, 9, 11, 5 | — | — | — | — | — | — | — |
| | 3 | — | — | 7, 6, 11, 13, 12, 5, 4, 8, 9 | — | — | — | — | — | — | — |
| | 4 | — | — | 12, 8, 7, 11, 13, 5, 4, 6, 9 | — | — | — | — | — | — | — |
| | 5 | — | — | 13, 12, 9, 8, 7, 5, 4, 11, 6 | — | — | — | — | — | — | — |
| | 6 | — | — | 13, 12, 11, 6, 8, 4, 9, 5 | — | — | — | — | — | — | — | wherein DL is downlink, HARQ is hybrid automatic repeat request, UL is uplink, SIB-1 is system information block-1, Subframe n indicates a subframe used to transmit the acknowledgement information, and each entry for the Subframe n indicates downlink association set indexes in terms of subframes relative to Subframe n for which acknowledgement information may be reported and defined the bit ordering.

Example 21. The method of any of examples 12 to 20, performed by a user equipment, wherein the user equipment is a time division duplex user equipment applying enhanced interference management and traffic adaptation.

An apparatus comprising one or more processors and one or more memories including computer program code. The one or more memories and the computer program code are configured to, with the one or more processors, cause the apparatus to perform any of the examples 1-21.

An apparatus comprising one or more processors and one or more memories including computer program code. The one or more memories and the computer program code are configured to, with the one or more processors, cause the apparatus to perform any of the methods of examples 1-21.

An apparatus comprising means for performing any of the methods of examples 1-21.

An additional exemplary embodiment includes a computer program, comprising code for performing the methods of any of the examples 1-21, when the computer program is run on a processor. The computer program according to this paragraph, wherein the computer program is a computer program product comprising a computer-readable medium bearing computer program code embodied therein for use with a computer.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that does not encompass propagating signals but may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects are set out above and in the claims, other aspects comprise other combinations of features from the described embodiments and the claims, and not solely the combinations described above or in the claims.

It is also noted herein that while the above describes example embodiments of the invention, these descriptions should not be viewed in a limiting sense. Rather, there are several variations and modifications which may be made without departing from the scope of the present invention as defined by the claims.

The following abbreviations that may be found in the specification and/or the drawing figures are defined as follows:

3GPP third generation partnership project
ACK acknowledgement
A/N, ACK/NACK acknowledgement/negative acknowledgement
ARO ACK/NACK Resource Offset
CCE Control Channel Element
CFI Carrier Format Indicator
CSI Channel State Information (includes CSI, PMI, RI, and PTI)
D Downlink subframe
DL Downlink (from base station to UE)
DwPTS Downlink Pilot Time Slot
ECCE Enhanced CCE eIMTA Enhanced Interference Management and Traffic Adaptation
eNB Enhanced Node B (LTE base station)
EPDCCH Enhanced Physical Downlink Control Channel
F Flexible subframe
HARQ Hybrid Automatic Repeat reQuest
LTE Long Term Evolution
MME Mobility Management Entity
ms milliseconds
NACK Negative ACK
OFDM Orthogonal Frequency Division Multiplex
PCell Primary Cell
PCFICH Physical Control Format Indicator Channel
PDCCH Physical Downlink Control Channel
PDSCH Physical Downlink Control Channel
PHICH Physical HARQ Indicator Channel
PUCCH Physical Uplink Control Channel
PUSCH Physical Uplink Shared Channel
RA Resource Allocation
RAN Radio Access Network
RB Resource Block
Rel Release
RRC Radio Resource Control
S Special subframe
SCell Secondary Cell
SC-FDMA Single-Carrier Frequency Division Multiple Access
SF Subframe
SIB System Information Block
SGW Serving GateWay
SPS Semi-Persistent Scheduling
SRI Scheduling Request Indicator
TD-LTE Time-Division-Long Term Evolution
TDD Time Division Duplexing
U Uplink subframe
UE User Equipment
UL Uplink (from UE to base station)
WI Work Item
WG Working Group

What is claimed is:

1. A method, comprising:
determining by a base station a first set of physical uplink control channel resources to use for a first set of user equipment to send acknowledgment information to the base station for a first group of downlink subframes, wherein the first set of physical uplink control channel resources starts at a first index;
determining by the base station a second set of physical uplink control channel resources to use for a second set of user equipment to send acknowledgment information to the base station for a second group of downlink subframes, wherein the user equipment in the first and second sets of user equipment are different, the second set of physical uplink control channel resources starts at a second index, the user equipment in the first set of user equipment only use the first set of physical uplink control channel resources to send the acknowledgment information to the base station for the first group of downlink subframes, and the user equipment in the second set of user equipment use the first set of physical uplink control channel resources to send the acknowledgment information to the base station for the first group of downlink subframes and use the second set of physical uplink control channel resources to send acknowledgment information to the base station for the second group of downlink subframes; and
for an uplink reception by the base station, receiving acknowledgement information from the first user equipment using the first set of physical uplink control channel resources and receiving acknowledgement information from the second user equipment using the first and second sets of physical uplink control channel resources,
wherein the first group of downlink subframes is limited to legacy downlink subframes, and the second group of downlink subframes is limited to non-legacy downlink subframes, and wherein:
the legacy downlink subframes correspond to those subframes that are defined as downlink or special subframes by downlink hybrid automatic repeat request reference configuration and that are associated with a same uplink subframe and a same subframe offset as a system information block-1 configured downlink or special subframes; and
the non-legacy downlink subframes correspond to other downlink, special or flexible subframes according to downlink hybrid automatic repeat request reference configuration than the legacy downlink subframes.

2. The method of claim 1, further comprising the base station signaling an indication of a starting point for the second set of physical uplink control channel resources to the user equipment in the second set of user equipment.

3. The method of claim 2, wherein signaling further comprises signaling by the base station by dedicated or common radio resource control signaling.

4. The method of claim 3, wherein the signaling is absolute and indicates an integer number indicating a starting index for the user equipment in the second set of user equipment.

5. The method of claim 3, wherein the signaling is relative and indicates an integer relative to a number of downlink subframes assigned to the user equipment in the first set of user equipment or relative to a starting index of the physical uplink control channel set of resources for the user equipment in the first set of user equipment, or relative to both the number of downlink subframes assigned to the user equipment in the first set of user equipment and to the starting index of the physical uplink control channel set of resources for the user equipment in the first set of user equipment.

6. The method of claim 1, wherein the user equipment in the first set of user equipment and the user equipment in the second set of user equipment use the following table for the first group of downlink subframes:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6 | — | — | — | — | 6 | — | — |
| | 1 | — | — | 7, 6 | — | — | — | — | 7, 6 | — | — |
| | 2 | — | — | 8, 7, 4, 6 | — | — | — | — | 8, 7, 4, 6 | — | — |
| | 3 | | | | invalid | | | | | | |

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| | 4 | | | | invalid | | | | | | |
| | 5 | | | | invalid | | | | | | |
| | 6 | — | — | 7 | — | — | — | — | 7 | — | — |
| 4 | 0 | — | — | (6) | — | — | — | — | — | — | — |
| | 1 | — | — | 7, (6) | 4 | — | — | — | — | — | — |
| | 2 | | | | invalid | | | | | | |
| | 3 | — | — | 7, (6), 11 | 6, 5 | — | — | — | — | — | — |
| | 4 | — | — | 12, 8, 7, 11 | 6, 5, 4, 7 | — | — | — | — | — | — |
| | 5 | | | | invalid | | | | | | |
| | 6 | — | — | 7 | 7 | — | — | — | — | — | — |
| 5 | 0 | — | — | 6 | — | — | — | — | — | — | — |
| | 1 | — | — | 7, 6 | — | — | — | — | — | — | — |
| | 2 | — | — | 8, 7, 4, 6 | — | — | — | — | — | — | — |
| | 3 | — | — | 7, 6, 11 | — | — | — | — | — | — | — |
| | 4 | — | — | 12, 8, 7, 11 | — | — | — | — | — | — | — |
| | 5 | — | — | 13, 12, 9, 8, 7, 5, 4, 11, 6 | — | — | — | — | — | — | — |
| | 6 | — | — | 7 | — | — | — | — | — | — | — | and wherein the user equipment in the second set of user equipment use the following table the second group of downlink subframes:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 8, 4 | — | — | — | — | 7, 8, 4 | — | — |
| | 1 | — | — | 8, 4 | — | — | — | — | 8, 4 | — | — |
| | 2 | — | — | — | — | — | — | — | — | — | — |
| | 3 | | | | invalid | | | | | | |
| | 4 | | | | invalid | | | | | | |
| | 5 | | | | invalid | | | | | | |
| | 6 | — | — | 6, 8, 4 | — | — | — | — | 6, 8, 4 | — | — |
| 4 | 0 | — | — | 12, 7, 11, 8 | 7, 6, 5, 4 | — | — | — | — | — | — |
| | 1 | — | — | 12, 8, 11 | 7, 6, 5 | — | — | — | — | — | — |
| | 2 | | | | invalid | | | | | | |
| | 3 | — | — | 12, 8 | 4, 7 | — | — | — | — | — | — |
| | 4 | — | — | — | — | — | — | — | — | — | — |
| | 5 | | | | invalid | | | | | | |
| | 6 | — | — | 12, 11, 8 | 4, 6, 5 | — | — | — | — | — | — |
| 5 | 0 | — | — | 12, 7, 11, 13, 8, 4, 9, 5 | — | — | — | — | — | — | — |
| | 1 | — | — | 13, 12, 8, 11, 4, 9, 5 | — | — | — | — | — | — | — |
| | 2 | — | — | 13, 12, 9, 11, 5 | — | — | — | — | — | — | — |
| | 3 | — | — | 13, 12, 5, 4, 8, 9 | — | — | — | — | — | — | — |
| | 4 | — | — | 13, 5, 4, 6, 9 | — | — | — | — | — | — | — |
| | 5 | — | — | — | — | — | — | — | — | — | — |
| | 6 | — | — | 13, 12, 11, 6, 8, 4, 9, 5 | — | — | — | — | — | — | — | wherein DL is downlink, HARQ is hybrid automatic repeat request, UL is uplink, SIB-1 is system information block-1, Subframe n indicates a subframe used to transmit the acknowledgement information, and each entry for the Subframe n indicates downlink association set indexes in terms of subframes relative to Subframe n for which acknowledgement information may be reported.

7. The method of claim 1, where for a single uplink subframe, bits for the acknowledgement information of the first set of user equipment are first in the physical uplink control channel resources, followed by bits for the acknowledgement information of the second set of user equipment.

8. The method of any of claim 7, wherein the following table specifies bit ordering:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6, 7, 8, 4 | — | — | — | — | 6, 7, 8, 4 | — | — |
| | 1 | — | — | 7, 6, 8, 4 | — | — | — | — | 7, 6, 8, 4 | — | — |
| | 2 | — | — | 8, 7, 4, 6 | — | — | — | — | 8, 7, 4, 6 | — | — |
| | 3 | | | | invalid | | | | | | |

-continued

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| | 4 | | | | invalid | | | | | | |
| | 5 | | | | invalid | | | | | | |
| | 6 | — | — | 7, 6, 8, 4 | — | | | | 7, 6, 8, 4 | — | — |
| 4 | 0 | — | — | 12, 7, 11, 8 | 7, 6, 5, 4 | — | — | — | — | — | — |
| | 1 | — | — | 7, 12, 8, 11 | 4, 7, 6, 5 | — | — | — | — | — | — |
| | 2 | | | | invalid | | | | | | |
| | 3 | — | — | 7, 11, 12, 8 | 6, 5, 4, 7 | — | — | — | — | — | — |
| | 4 | — | — | 12, 8, 7, 11 | 6, 5, 4, 7 | — | — | — | — | — | — |
| | 5 | | | | invalid | | | | | | |
| | 6 | — | — | 7, 12, 11, 8 | 7, 4, 6, 5 | — | — | — | — | — | — |
| 5 | 0 | — | — | 6, 12, 7, 11, 13, 8, 4, 9, 5 | — | — | — | — | — | — | — |
| | 1 | — | — | 7, 6, 13, 12, 8, 11, 4, 9, 5 | — | — | — | — | — | — | — |
| | 2 | — | — | 8, 7, 4, 6, 13, 12, 9, 11, 5 | — | — | — | — | — | — | — |
| | 3 | — | — | 7, 6, 11, 13, 12, 5, 4, 8, 9 | — | — | — | — | — | — | — |
| | 4 | — | — | 12, 8, 7, 11, 13, 5, 4, 6, 9 | — | — | — | — | — | — | — |
| | 5 | — | — | 13, 12, 9, 8, 7, 5, 4, 11, 6 | — | — | — | — | — | — | — |
| | 6 | — | — | 13, 12, 11, 6, 8, 4, 9, 5 | — | — | — | — | — | — | — | wherein DL is downlink, HARQ is hybrid automatic repeat request, UL is uplink, SIB-1 is system information block-1, Subframe n indicates a subframe used to transmit the acknowledgement information, and each entry for the Subframe n indicates downlink association set indexes in terms of subframes relative to Subframe n for which acknowledgement information may be reported and defined the bit ordering.

9. The method of claim 1, wherein the user equipment in the first set of user equipment are time division duplex user equipment not applying enhanced interference management and traffic adaptation, and wherein the user equipment in the second set of user equipment are time division duplex user equipment applying enhanced interference management and traffic adaptation.

10. A method, comprising:
determining configuration of physical uplink control channel resources corresponding to two different groups of downlink subframes, wherein a first group includes a first set of downlink subframes and a second group includes a second set of downlink subframes;
determining a starting point of a first set of physical uplink control channel resources to be used for transmitting acknowledgement information for downlink subframes in the first set of downlink subframes;
determining a starting point of a second set of physical uplink control channel resources to be used for transmitting acknowledgement information for downlink subframes in the second set of downlink subframes;
for a given downlink subframe, receiving information on a physical downlink control channel, which schedules physical downlink shared channel data, and performing the following:
determining to which group of the groups of subframes the given downlink subframe belongs, and for the given downlink subframe, determining an index of a lowest control channel element of the scheduling physical downlink control channel;
based on at least physical uplink control channel resource configuration, the index of the lowest control channel element, a current subframe index, the determined group, and the determined starting points, determining one or more physical uplink control channel resources for acknowledgement transmission corresponding to the received physical downlink shared channel data; and
transmitting, using one or both of the starting points for the first and second set of physical uplink control channel resources, acknowledgement information on the determined one or more physical uplink control channel resources,
wherein the first group of downlink subframes is limited to legacy downlink subframes, and the second group of downlink subframes is limited to non-legacy downlink subframes, and wherein:
the legacy downlink subframes correspond to those subframes that are defined as downlink or special subframes by downlink hybrid automatic repeat request reference configuration and that are associated with a same uplink subframe and a same subframe offset as a system information block-1 configured downlink or special subframes; and
the non-legacy downlink subframes correspond to other downlink, special or flexible subframes according to downlink hybrid automatic repeat request reference configuration than the legacy downlink subframes.

11. The method of claim 10, further comprising receiving from a base station signaling an indication of the starting point for the second set of the physical uplink control channel resources.

12. The method of claim 11, wherein receiving further comprises receiving the signaling by dedicated or common radio resource control signaling.

13. The method of claim 12, wherein the signaling is absolute and indicates an integer number indicating a starting index.

14. The method of claim 10, performed by a user equipment, wherein the user equipment uses the following table for downlink subframes in the first group:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6 | — | — | — | — | 6 | — | — |
| | 1 | — | — | 7, 6 | — | — | — | — | 7, 6 | — | — |
| | 2 | — | — | 8, 7, 4, 6 | — | — | — | — | 8, 7, 4, 6 | — | — |
| | 3 | | | | invalid | | | | | | |
| | 4 | | | | invalid | | | | | | |
| | 5 | | | | invalid | | | | | | |
| | 6 | — | — | 7 | — | — | — | — | 7 | — | — |
| 4 | 0 | — | — | (6) | — | — | — | — | — | — | — |
| | 1 | — | — | 7, (6) | 4 | — | — | — | — | — | — |
| | 2 | | | | invalid | | | | | | |
| | 3 | — | — | 7, (6), 11 | 6, 5 | — | — | — | — | — | — |
| | 4 | — | — | 12, 8, 7, 11 | 6, 5, 4, 7 | — | — | — | — | — | — |
| | 5 | | | | invalid | | | | | | |
| | 6 | — | — | 7 | 7 | — | — | — | — | — | — |
| 5 | 0 | — | — | 6 | — | — | — | — | — | — | — |
| | 1 | — | — | 7, 6 | — | — | — | — | — | — | — |
| | 2 | — | — | 8, 7, 4, 6 | — | — | — | — | — | — | — |
| | 3 | — | — | 7, 6, 11 | — | — | — | — | — | — | — |
| | 4 | — | — | 12, 8, 7, 11 | — | — | — | — | — | — | — |
| | 5 | — | — | 13, 12, 9, 8, 7, 5, 4, 11, 6 | — | — | — | — | — | — | — |
| | 6 | — | — | 7 | — | — | — | — | — | — | — | and wherein the user equipment uses the following table for downlink subframes in the second group:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 8, 4 | — | — | — | — | 7, 8, 4 | — | — |
| | 1 | — | — | 8, 4 | — | — | — | — | 8, 4 | — | — |
| | 2 | — | — | — | — | — | — | — | — | — | — |
| | 3 | | | | invalid | | | | | | |
| | 4 | | | | invalid | | | | | | |
| | 5 | | | | invalid | | | | | | |
| | 6 | — | — | 6, 8, 4 | — | — | — | — | 6, 8, 4 | — | — |
| 4 | 0 | — | — | 12, 7, 11, 8 | 7, 6, 5, 4 | — | — | — | — | — | — |
| | 1 | — | — | 12, 8, 11 | 7, 6, 5 | — | — | — | — | — | — |
| | 2 | | | | invalid | | | | | | |
| | 3 | — | — | 12, 8 | 4, 7 | — | — | — | — | — | — |
| | 4 | — | — | — | — | — | — | — | — | — | — |
| | 5 | | | | invalid | | | | | | |
| | 6 | — | — | 12, 11, 8 | 4, 6, 5 | — | — | — | — | — | — |
| 5 | 0 | — | — | 12, 7, 11, 13, 8, 4, 9, 5 | — | — | — | — | — | — | — |
| | 1 | — | — | 13, 12, 8, 11, 4, 9, 5 | — | — | — | — | — | — | — |
| | 2 | — | — | 13, 12, 9, 11, 5 | — | — | — | — | — | — | — |
| | 3 | — | — | 13, 12, 5, 4, 8, 9 | — | — | — | — | — | — | — |
| | 4 | — | — | 13, 5, 4, 6, 9 | — | — | — | — | — | — | — |
| | 5 | — | — | — | — | — | — | — | — | — | — |
| | 6 | — | — | 13, 12, 11, 6, 8, 4, 9, 5 | — | — | — | — | — | — | — | wherein DL is downlink, HARQ is hybrid automatic repeat request, UL is uplink, SIB-1 is system information block-1, Subframe n indicates a subframe used to transmit the acknowledgement information, and each entry for the Subframe n indicates downlink association set indexes in terms of subframes relative to Subframe n for which acknowledgement information may be reported.

15. The method of claim 10, where for a single subframe, bits for the acknowledgement information of the first group of downlink subframes are first in the physical uplink control channel resources, followed by bits for the acknowledgement information of the second group of downlink subframes.

16. The method of claim 15, wherein the following table specifies bit ordering:

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6, 7, 8, 4 | — | — | — | — | 6, 7, 8, 4 | — | — |
| | 1 | — | — | 7, 6, 8, 4 | — | — | — | — | 7, 6, 8, 4 | — | — |

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| | 2 | — | — | 8, 7, 4, 6 | — | — | — | — | 8, 7, 4, 6 | — | — |
| | 3 | | | | invalid | | | | | | |
| | 4 | | | | invalid | | | | | | |
| | 5 | | | | invalid | | | | | | |
| | 6 | — | — | 7, 6, 8, 4 | — | — | — | — | 7, 6, 8, 4 | — | — |
| 4 | 0 | — | — | 12, 7, 11, 8 | 7, 6, 5, 4 | — | — | — | — | — | — |
| | 1 | — | — | 7, 12, 8, 11 | 4, 7, 6, 5 | — | — | — | — | — | — |
| | 2 | | | | invalid | | | | | | |
| | 3 | — | — | 7, 11, 12, 8 | 6, 5, 4, 7 | — | — | — | — | — | — |
| | 4 | — | — | 12, 8, 7, 11 | 6, 5, 4, 7 | — | — | — | — | — | — |
| | 5 | | | | invalid | | | | | | |
| | 6 | — | — | 7, 12, 11, 8 | 7, 4, 6, 5 | — | — | — | — | — | — |
| 5 | 0 | — | — | 6, 12, 7, 11, 13, 8, 4, 9, 5 | — | — | — | — | — | — | — |
| | 1 | — | — | 7, 6, 13, 12, 8, 11, 4, 9, 5 | — | — | — | — | — | — | — |
| | 2 | — | — | 8, 7, 4, 6, 13, 12, 9, 11, 5 | — | — | — | — | — | — | — |
| | 3 | — | — | 7, 6, 11, 13, 12, 5, 4, 8, 9 | — | — | — | — | — | — | — |
| | 4 | — | — | 12, 8, 7, 11, 13, 5, 4, 6, 9 | — | — | — | — | — | — | — |
| | 5 | — | — | 13, 12, 9, 8, 7, 5, 4, 11, 6 | — | — | — | — | — | — | — |
| | 6 | — | — | 13, 12, 11, 6, 8, 4, 9, 5 | — | — | — | — | — | — | — | wherein DL is downlink, HARQ is hybrid automatic repeat request, UL is uplink, SIB-1 is system information block-1, Subframe n indicates a subframe used to transmit the acknowledgement information, and each entry for the Subframe n indicates downlink association set indexes in terms of subframes relative to Subframe n for which acknowledgement information may be reported and defined the bit ordering.

17. The method of claim 10, performed by a user equipment, wherein the user equipment is a time division duplex user equipment applying enhanced interference management and traffic adaptation.

18. An apparatus, comprising:
one or more processors and one or more memories including computer program code, wherein the one or more memories and the computer program code are configured to, with the one or more processors, cause the apparatus to perform at least the following:
determining a first set of physical uplink control channel resources to use for a first set of user equipment to send acknowledgment information to the apparatus for a first group of downlink subframes, wherein the first set of physical uplink control channel resources starts at a first index;
determining a second set of physical uplink control channel resources to use for a second set of user equipment to send acknowledgment information to the apparatus for a second group of downlink subframes, wherein the user equipment in the first and second sets of user equipment are different, the second set of physical uplink control channel resources starts at a second index, the user equipment in the first set of user equipment only use the first set of physical uplink control channel resources to send the acknowledgment information to the apparatus for the first group of downlink subframes, and the user equipment in the second set of user equipment use the first set of physical uplink control channel resources to send the acknowledgment information to the apparatus for the first group of downlink subframes and use the second set of physical uplink control channel resources to send acknowledgment information to the apparatus for the second group of downlink subframes; and for an uplink reception by the apparatus, receiving acknowledgement information from the first user equipment using the first set of physical uplink control channel resources and receiving acknowledgement information from the second user equipment using the first and second sets of physical uplink control channel resources, wherein the first group of downlink subframes is limited to legacy downlink subframes, and the second group of downlink subframes is limited to non-legacy downlink subframes, and wherein:
the legacy downlink subframes correspond to those subframes that are defined as downlink or special subframes by downlink hybrid automatic repeat request reference configuration and that are associated with a same uplink subframe and a same subframe offset as a system information block-1 configured downlink or special subframes; and
the non-legacy downlink subframes correspond to other downlink, special or flexible subframes according to downlink hybrid automatic repeat request reference configuration than the legacy downlink subframes.

19. An apparatus, comprising:
one or more processors and one or more memories including computer program code, wherein the one or more memories and the computer program code are configured to, with the one or more processors, cause the apparatus to perform at least the following:
determining configuration of physical uplink control channel resources corresponding to two different groups of downlink subframes, wherein a first group includes a first set of downlink subframes and a second group includes a second set of downlink subframes;
determining a starting point of a first set of physical uplink control channel resources to be used for transmitting acknowledgement information for downlink subframes in the first set of downlink subframes;

determining a starting point of a second set of physical uplink control channel resources to be used for transmitting acknowledgement information for downlink subframes in the second set of downlink subframes, wherein the first group of downlink subframes is limited to legacy downlink subframes, and the second group of downlink subframes is limited to non-legacy downlink subframes;

for a given downlink subframe, receiving information on a physical downlink control channel, which schedules physical downlink shared channel data, and performing the following: determining to which group of the groups of subframes the given downlink subframe belongs, and for the given downlink subframe, determining an index of a lowest control channel element of the scheduling physical downlink control channel;

based on at least physical uplink control channel resource configuration, the index of the lowest control channel element, a current subframe index, the determined group, and the determined starting points, determining one or more physical uplink control channel resources for acknowledgement transmission corresponding to the received physical downlink shared channel data; and transmitting, using one or both of the starting points for the first and second set of physical uplink control channel resources, acknowledgement information on the determined one or more physical uplink control channel resources wherein the first group of downlink subframes is limited to legacy downlink subframes, and the second group of downlink subframes is limited to non-legacy downlink subframes, and wherein:

the legacy downlink subframes correspond to those subframes that are defined as downlink or special subframes by downlink hybrid automatic repeat request reference configuration and that are associated with a same uplink subframe and a same subframe offset as a system information block-1 configured downlink or special subframes; and the non-legacy downlink subframes correspond to other downlink, special or flexible subframes according to downlink hybrid automatic repeat request reference configuration than the legacy downlink subframes.

* * * * *